(12) United States Patent
Hoult et al.

(10) Patent No.: US 8,284,484 B2
(45) Date of Patent: Oct. 9, 2012

(54) RELATING TO SCANNING CONFOCAL MICROSCOPY

(75) Inventors: Robert Alan Hoult, Beaconsfield (GB);
Steve Morris Bush, Wycombe (GB);
George Robert Sealy, Mitchum (GB);
Dionisis Korontzis, Milton Keynes (GB)

(73) Assignee: PerkinElmer Singapore PTE, Ltd., Singapore (SG)

( * ) Notice: Subject to any disclaimer, the term of this patent is extended or adjusted under 35 U.S.C. 154(b) by 687 days.

(21) Appl. No.: 12/440,790

(22) PCT Filed: Sep. 14, 2007

(86) PCT No.: PCT/GB2007/003446
§ 371 (c)(1),
(2), (4) Date: Jun. 15, 2009

(87) PCT Pub. No.: WO2008/032055
PCT Pub. Date: Mar. 20, 2008

(65) Prior Publication Data
US 2009/0279169 A1    Nov. 12, 2009

(30) Foreign Application Priority Data

Sep. 14, 2006  (GB) .................................. 0618057.4

(51) Int. Cl.
*G02B 21/06* (2006.01)
(52) U.S. Cl. ....................................... 359/385; 359/388
(58) Field of Classification Search .................. 359/381, 359/384, 385–390, 399
See application file for complete search history.

(56) References Cited

U.S. PATENT DOCUMENTS

| 5,334,830 | A  | 8/1994 | Fukuyama |
| 6,219,182 | B1 | 4/2001 | McKinley |
| 2005/0030650 | A1 | 2/2005 | Ojima |
| 2005/0161593 | A1 | 7/2005 | Kitahara |
| 2006/0012785 | A1 | 1/2006 | Funk |

FOREIGN PATENT DOCUMENTS

| CN | 1385720 A | 12/2002 |
| CN | 2546893 Y | 4/2003 |
| WO | WO-2004/095846 A1 | 11/2004 |

*Primary Examiner* — Frank Font
(74) *Attorney, Agent, or Firm* — Barnes & Thornburg LLP

(57) ABSTRACT

An assembly (100) and a method are provided for inputting a light beam into a light path extending from the confocal scanning head (102) to the microscope (104) of a scanning confocal microscope system to illuminate a selected region of a sample mounted in the microscope. The assembly comprises a light input for receiving a light beam from a light source; beam directing means (8, 12) for controlling the path of the light beam with reference to the shape of the selected region of the sample; and a beam coupler (16) for selective coupling the light beam into the light path from the confocal scanning head (102) to the microscope (104), with the beam direction being controlled by the beam directing means so as to illuminate the selected region. A scanning confocal microscope system including such an assembly is also described, together with a method of calibrating the system. In addition, an optical switch for selectively switching a light beam between two paths is disclosed.

34 Claims, 15 Drawing Sheets

RELATING TO SCANNING CONFOCAL MICROSCOPY

FIELD OF THE INVENTION

The present invention relates to scanning confocal microscopy, and more particularly to selective illumination of one or more regions of a sample mounted in a scanning confocal microscope system.

BACKGROUND TO THE INVENTION

Confocal microscopes are used routinely for viewing internal details of semi-transparent microscopic bodies, especially in biological applications, often employing fluorescence illumination. The essential feature of such a microscope is the illumination of the sample by light focused through a pinhole, combined with observation of the returned light through the same pinhole, the result being that the detected light relates substantially to the specific image plane of the pinhole within the sample, rather than to planes above or below. This permits accurate depth resolution within the sample. Typically, a laser is used to provide a very tightly focused intense beam at the pinhole.

As described above, such a system gives information about only one point in the sample. However, the principle can be extended by two alternative and quite distinct approaches to give an extended image of the sample. In the first method, called 'scanning spot' the pinhole is scanned optically over the region of interest and the returned intensity is recorded in order to reconstruct an image of the sample. In the second method, many pinholes are illuminated in parallel to give simultaneous information across the region of interest. One such configuration is the 'Nipkow disk' in which the pinholes are set into a disk which is then spun to give multiple scanned coverage of the region. This approach lends itself particularly well to the high speed imaging of live cells, a subject of considerable biological interest currently. Nevertheless, the present invention is relevant to all forms of confocal scanning but most particularly to those employing multiple pinholes.

Some known analysis techniques involve delivery of a powerful beam of light to a selected area of the sample for the purpose of modifying the properties of the sample material in the selected area. For example, many of the dyes used in fluorescence microscopy will 'bleach' when exposed to very strong light sources.

Bleaching a particular area allows that area to be 'tagged'—to be distinguished from adjacent regions which might otherwise be indistinguishable, thereby allowing that area to be tracked as it moves and develops. Such "Fluorescence Recovery After Photobleaching" (or FRAP) allows transport mechanisms within a cell to be monitored. Typically, diffusion processes will cause the bleached spot to recover after a period of time determined by the diffusion rate. For low viscosity media, this can be very fast, in the millisecond range.

A second example of targeted illumination is photoactivation. Some dyes will change their fluorescence colour when activated by a very strong light source. Again, this allows a region to be 'tagged' and transport mechanisms to be studied.

Scanning spot confocal systems lend themselves quite well to targeted illumination applications. The single scanning spot covers all parts of the sample and so increasing the laser power while the spot is over the region of interest produces targeted illumination. Despite the fact that such an approach is rather slow and inefficient, targeted illumination has been available on scanning spot systems for some years.

However, this is not the case for spinning disk systems where the parallel illumination of the optical arrangement gives no obvious opportunity to increase the light intensity dramatically over a specified region.

SUMMARY OF THE INVENTION

The present invention provides an assembly for inputting a light beam into a light path extending from the confocal scanning head to the microscope of a scanning confocal microscope system to illuminate a selected region of a sample mounted in the microscope, wherein the assembly comprises:
   a light input for receiving a light beam from a light source;
   beam directing means for controlling the path of the light
      beam with reference to the shape of the selected region
      of the sample; and
   a beam coupler for selectively coupling the light beam into
      the light path from the confocal scanning head to the
      microscope, with the beam direction being controlled by
      the beam directing means so as to illuminate the selected
      region.

In particular, the intensity of the light beam may be sufficient to bleach or otherwise modify the optical properties of fluorescent parts of the selected region of the sample, to enable FRAP or photoactivation experiments to be conducted, for example.

Arrangement of the microscope system such that the light beam from the assembly is selectively inputted into the same port as used by the confocal head is beneficial as it allows the coupling (switching) means to be located outside the microscope. The invention can therefore be implemented without requiring access to the interior of the microscope, or needing to accommodate additional components within the microscope.

To allow sufficient space for the assembly to be inserted between the confocal scanning head and the microscope port, the assembly may include an optical relay to relay a sample image formed on the light path between the confocal scanning head and the microscope from the microscope side of the assembly to the scanning confocal head side of the assembly. Thus operation of the confocal scanning head may be substantially unaffected by the introduction of the assembly.

Preferably, the optical relay includes a baffle defining a hole in the light path to reduce transmission of stray light.

A field lens may be provided between the beam coupler and the microscope to converge the light beam.

The beam coupler may include a reflective element selectively insertable into the light path between the confocal scanning head and the microscope to facilitate injection of the transmitted light beam into the light path. The reflective element may be in the form of a mirror. Advantageously, the reflective element may be a beamsplitter to allow the sample to be viewed during illumination by the assembly.

In a preferred embodiment, the assembly includes means for selectively changing the diameter of the transmitted light beam to adjust the illumination spot size created at the sample. This may be achieved by selective insertion of telescopes having different optical properties in the beam path through the assembly.

Preferably, front and rear telescope lenses are mounted on respective rotatable supports, to allow selective insertion of a lens mounted on each support into the beam path.

The assembly may further include means for adjusting the direction and lateral displacement of a light beam inputted into the assembly. For this purpose, an input beam collimator may be mounted so as to allow its orientation to be altered so as to effect these adjustments. In a preferred implementation, the collimator has a cylindrical outer surface adjacent each end, and two screw threaded adjusters are provided in contact with each of these surfaces. The axes of the adjusters are preferably substantially parallel and appropriate manipulation of the adjusters allows the light beam path to be adjusted as required. Provision of the adjusters in a parallel configuration (rather than in pairs of perpendicular adjusters) enables them to be mounted so as to all be accessible by a user from one side of the assembly.

In a preferred embodiment, the beam directing means comprise two pivotably mounted mirrors, their pivotal axes being substantially mutually perpendicular to allow the direction of the beam to be altered in two orthogonal directions (that is, x and y directions in the plane of the sample). In addition, a lens may be provided to convert these angular deflections of the beam into parallel beam displacements.

The directing means may be operable to direct the beam towards one or more discrete points on a sample, or to manipulate the beam so that a predetermined region is substantially uniformly illuminated.

Preferably, means are provided for imaging one of the pivotably mounted mirrors onto the other, such as an optical relay for example. In one embodiment, the relay comprises two lens pairs.

Additional mirrors may be provided in the optical path between the pivotably mounted mirrors to reduce the length of the space occupied thereby. In particular, the additional mirrors may comprise a pair of plane mirrors in a mutually orthogonal configuration so as to reverse the direction of a beam incident on one of them. They may be mounted such that their position is adjustable along a line parallel to the incident beam, to provide focus adjustment.

In a preferred configuration, an aiming lens is provided to convert angular deflections of the light beam caused by the beam directing means into parallel beam displacements. The aiming lens may be mounted in such a way that its location is adjustable laterally with respect to the light path therethrough, using two mutually orthogonal screw-threaded adjusters, for example. This permits alignment of the light beam inputted by the assembly with the viewing beam from the confocal head.

A target may be selectively insertable in the light path in the image plane on the microscope side of the assembly to assist calibration of the assembly.

A microscope system is also provided which comprises a microscope, a camera, a confocal scanning head, a light input assembly as described herein, and a light source coupled to the assembly, wherein the system includes a controller for controlling both the beam directing means and the light source so as to illuminate a selected region of a sample.

In a preferred embodiment, the controller is operable to output control signals to the beam directing means which define movement of the beam as a sequence of steps of substantially equal length.

This may serve to move the directed light beam over the sample at a reasonably constant velocity, so that illumination of the selected region is substantially even. Also, this may simplify computation of the required steps.

The controller may calculate the steps at a resolution greater than that of the system camera to provide smoother and more accurate movement of the beam. Preferably the resolution is around 60 times greater or more.

Storage memory may be incorporated in the controller which is configured to store a set of instructions for controlling the light source separately from a set of instructions for controlling the beam directing means, such that either set of instructions can be updated independently of the other set.

In a preferred embodiment, the controller is operable to process in parallel instructions for controlling the light source and instructions for controlling the beam directing means. The controller may include an FPGA programmed to calculate the control parameters to be outputted to the directing means and the light source. In particular, it may be configured to run in parallel programs which calculate these parameters. This provides increased synchronisation between the control parameters relative to the use of two or more separate processors as the programs can run on the FPGA with reference to a common clock.

The present invention further provides an optical switch for selectively switching the light beam outputted by the light source between the light input of the confocal head and the light input of the light beam input assembly.

The optical switch may comprise a plane mirror and a driver for changing the orientation of the mirror. The driver is preferably a direct drive DC motor. It may include a rotary encoder for generating a signal indicative of the mirror's orientation.

In one implementation, the mirror is switchable between a first position in which the light beam is not incident on the mirror, but passes directly through the switch to the confocal head input, and a second position in which the light beam is diverted for transmission to the light input of the light beam input assembly.

Advantageously, an optical relay may be provided in each light path through the optical switch, to reduce sensitivity to angular misalignment in the switch. The relay transfers the light input to the switch assembly to its output and focuses the input beam to a point between the input and the output. Preferably this point is close to the mirror of the switch (when in the second position).

The relay may be in the form of lenses located at the input and the two outputs of the switch assembly. Preferably a pair of achromatic lenses (Edmund X08-050 for example) is provided at each of the input and the outputs.

Preferably, the mirror is switchable between two end stops and control means are coupled to the driver to accelerate the mirror during a first portion of its travel between the end stops and decelerate the mirror during a second portion of its travel.

The assembly may be employed in a single point confocal scanning microscope system, but is particularly directed at a multiple point confocal scanning microscope system.

According to a further aspect, the invention provides a method of calibrating a microscope system including a light input assembly as described herein, comprising the steps of:
(a) illuminating each of at least six points in turn according to predetermined beams directing means settings;
(b) recording the position of each point with the camera;
(c) determining the camera pixel location of each point; and
(d) inputting the pairs of beam directing means settings (u, v) and pixel locations (x, y) into the following equations:

$$u = a_{1,1} + a_{2,1}x + a_{3,1}y + a_{4,1}xy + a_{5,1}x^2 + a_{6,1}y^2$$

$$v = a_{1,2} + a_{2,2}x + a_{3,2}y + a_{4,2}xy + a_{5,2}x^2 + a_{6,2}y^2$$

and calculating the coefficients $a_{1,1}$ to $a_{6,2}$ from the resulting simultaneous equations.

The invention also provides a method of illuminating a selected region of a sample mounted in a scanning confocal microscope system including a confocal scanning head and a microscope, the method comprising the steps of:
(a) receiving a light beam from a light source;
(b) controlling the path of the light beam with reference to the shape of the selected region of the sample; and (c) selectively coupling the light beam into a light path from the confocal scanning head to the microscope, with the beam direction being controlled by the beam directing means so as to illuminate the selected region of the sample.

BRIEF DESCRIPTION OF THE DRAWINGS

Embodiments of the invention will now be described with reference to the accompanying schematic drawings, wherein.

DETAILED DESCRIPTION

Figure 1:
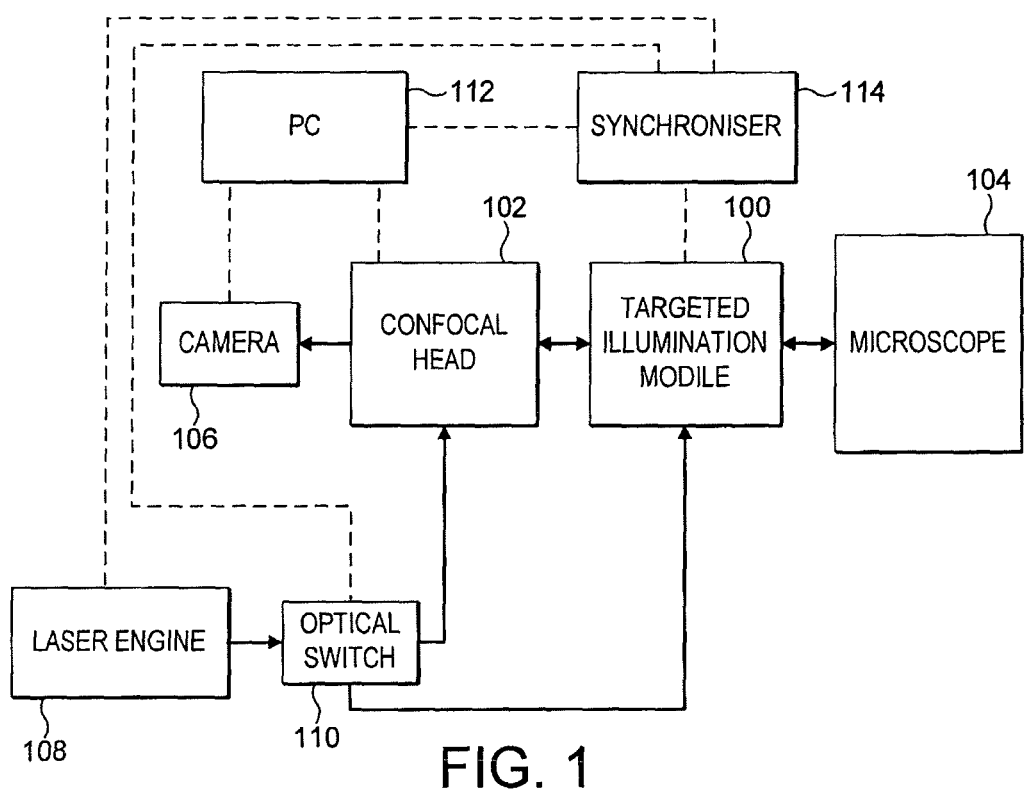
FIG. 1 is a block diagram of a confocal microscope system according to an embodiment of the invention.

FIG. 1 illustrates a block diagram of a scanning confocal microscope system according to an embodiment of the present invention. It includes a targeted illumination module which embodies a light beam input assembly as described herein. This module is also referred to as "the FRAP module" below.

In the system of FIG. 1, the targeted illumination module is located between confocal head 102 and microscope 104. Camera 106 is able to view a sample mounted in the microscope via confocal head 102 and module 100. A laser engine 108 is coupled to an optical switch 110 which is operable to direct laser light from the laser engine either to the confocal head 102 or to module 100.

These components of the system are controlled and synchronised in accordance with user input by a PC 112 and synchroniser 114. The PC is coupled to the confocal head 102, camera 106 and the synchroniser, whilst the synchroniser is in turn coupled to module 100, laser engine 108 and optical switch 110.

FRAP Module

The function of the FRAP module is to inject tightly focused and accurately located high power laser radiation to a user-selected target in the field of view of the microscope, while allowing the target to be viewed in the normal confocal manner a very short time later. The module is a box approximately the size and shape of a confocal head that is interposed between the confocal head and the output port of the microscope. Diagrams illustrating optical elements of the FRAP module are shown in FIGS. 2 to 8.

Figure 2:
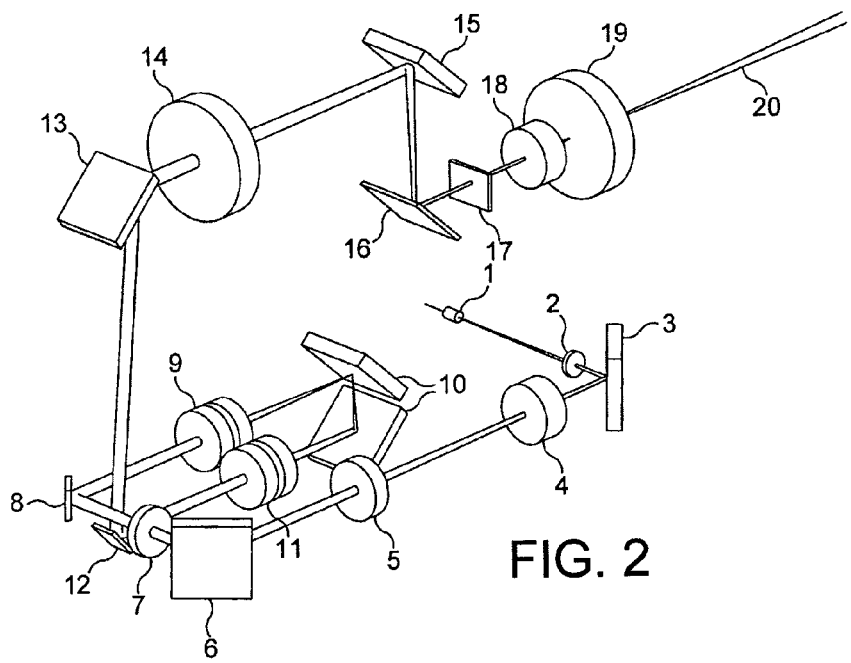
FIG. 2 is a schematic perspective view of the optical elements of a light input assembly (or targeted illumination module) according to an embodiment of the invention in illumination mode.

FIG. 2 shows the beam path through the FRAP module from the light input to the microscope when the module is in sample illumination mode, with features numbered as follows:

| | |
|---|---|
| 1 | single mode input fibre with collimator |
| 2 | end of input adjustment barrel |
| 3 | first fold mirror |
| 4 | first lens (negative) of beam expander |
| 5 | second lens (positive) of beam expander |
| 6 | second fold mirror |
| 7 | neutral density filter (attenuator) |
| 8 | X galvanometer mirror |
| 9 | first galvo relay lenses |
| 10 | roof mirror pair |
| 11 | second galvo relay lenses |
| 12 | Y galvanometer mirror |
| 13 | third fold mirror |
| 14 | f-theta lens |
| 15 | fourth fold mirror |
| 16 | injection mirror (beamsplitter) |
| 17 | sample image plane |
| 18 | C-mount flange location (microscope coupling) |
| 19 | field lens |
| 20 | output beam to microscope |

In a typical confocal microscope system, the image plane of the microscope output port is very close to the body of the microscope and hence the confocal head is close-coupled to the output port. As a result, there is scant room to provide for injection of the FRAP beam. The FRAP module solves this problem with optics that relay the sample image from the front of the module to the rear, allowing the confocal head to operate in a virtually identical fashion, but creating space at the front of the relay for injection optics.

Figure 3:
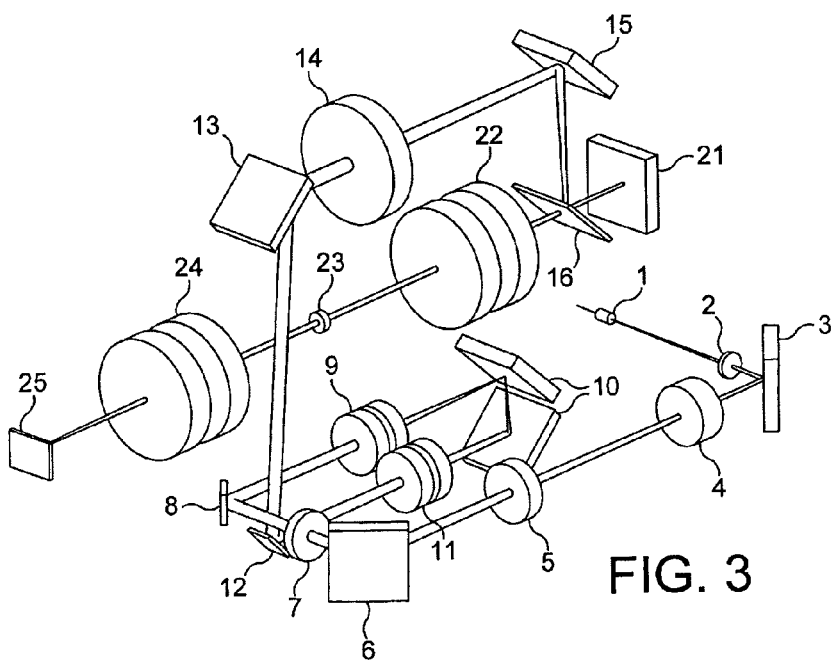
FIG. 3 is a similar view to that of FIG. 2 showing the assembly in calibration mode.

The location of the relay lenses in relation to the elements of the FRAP module shown in FIG. 2 is illustrated in FIG. 3. In this figure, the module is depicted in calibration mode, employing a calibration target or mirror 21 as described further below. Other features in FIG. 3 are as follows:

| | |
|---|---|
| 22 | first main relay lenses |
| 23 | central relay baffle (aperture) |
| 24 | second main relay lenses |
| 25 | relayed sample image plane (within confocal head) |

The relay has to handle only a very restricted f-number from the microscope and a baffle 23 with a relatively small hole is placed at the centre of the relay to eliminate any stray light, especially from the FRAP laser system. The remainder of the FRAP module consists of laser beam conditioning and steering optics.

Figure 4:
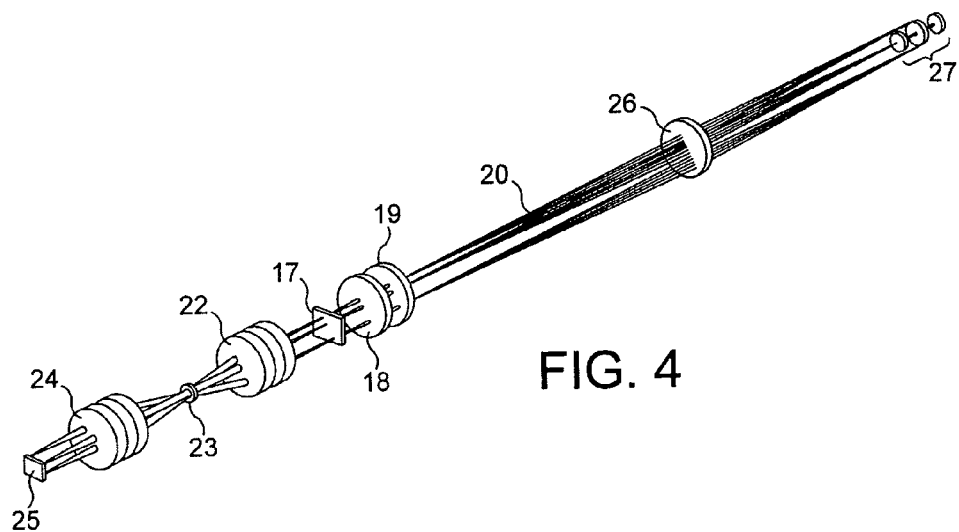
FIGS. 4 to 8 are ray diagrams relating to selected optical elements of the module shown in FIG. 2.

FIG. 4 illustrates the paths of rays from a sample image plane 25 through a simplified representation of the microscope optics when the FRAP module is in viewing mode. Lens 26 represents a microscope tube lens and lenses 27 represent a microscope compound objective.

The basic optical system of the FRAP module comprises: an input fibre 1 with collimator to provide a collimated input beam; two pivotable mirrors 8, 12 driven by galvanometer movements to deflect the beam horizontally (X) and vertically (Y) in order to direct the beam to the desired location; an 'f-theta' lens 14 to convert these angular deflections into parallel beam displacements, at the same time focusing the beam to a small spot; and a motorised injection mirror 16 rather similar to the optical switch described above, in order to inject the FRAP beam into the microscope output port.

Conceptually, the operation is as follows: the injection mirror 16 is switched to inject the laser beam; at the same time, the optical switch 110 is activated to divert the laser source to the FRAP input fibre; the galvos are moved to steer the beam to the desired target; and then the laser is turned on. Immediately after the FRAP operation has completed, the injection mirror and the optical switch mirror are returned to their original positions, allowing the sample to be viewed in the normal way. Note that the galvos operate very rapidly, so with programmed control it is feasible to target scanned areas of the sample rather than just isolated spots.

However, in order to function most effectively, the optical system has a number of refinements. As described above, the basic system delivers an output beam focused on the desired target in the image plane and travelling parallel to the optical axis of the microscope system. This parallelism is termed 'telecentricity'. However, the optimum coupling for most microscopes requires slight non-parallelism, typically convergence. Hence a weak 'field lens' 19 may be added to the front of the FRAP module to give the needed convergence.

The same problem applies normally to the confocal head, which already has a field lens fitted. The field lens may therefore be removed from the confocal head and replaced with the appropriate field lens at the front of the FRAP module.

Removing the field lens from the confocal head shifts its focus slightly, so to compensate and to provide protection from contamination, this particular lens may be replaced with a plane glass window. However, the location in the confocal head is awkward to access and uncomfortably close to the focal plane so the glass window may instead be located in the C-mount coupling between the confocal head and the FRAP module. For similar reasons, the new field lens is preferably located in the C-mount coupling between the FRAP module and the microscope. This is especially appropriate since both the field lens and its C-mount are unique to the model of microscope fitted.

The practical consequence of not fitting, or fitting the wrong, field lens is that when the target is displaced from the centre of the field of view, the laser beam may actually miss or partially miss, the rear aperture of the microscope. Slightly less seriously, the beam may arrive off-centre with the result that the FRAP beam at the sample is canted and the targeted area shifts noticeably in the field of view as the Z depth in the sample is varied. A similar problem occurs with viewing when the beam is not centred at the rear of the objective. The viewing beam should be centred at the same time as the FRAP beam. The viewing beam is centred by adjusting the pointing of the entire confocal head taking advantage of slop in the C-mount coupling to the microscope. However, for reasons of stability, the FRAP module is preferably hard-mounted to the confocal head and consequently, an independent aiming mechanism is required for the FRAP module. This is achieved by displacing the f-theta lens 14 sideways with two screw adjustments, thereby adjusting the pointing of the FRAP beam without affecting the viewing.

A secondary cause of non-telecentricity lies in the relationship between the galvo mirrors 8, 12 and the f-theta lens 14. The lens can only function effectively for a single centre of deflection but with two galvos, there are two such centres displaced by the significant physical separation of the mirrors. One solution to this problem is to image one galvo mirror on to the other galvo mirror. That way, both mirrors appear to be in the same plane. We do not wish to affect the other properties of the laser beam, so this imaging is achieved with an optical relay 9, 11 between the galvos which leaves the beam otherwise unchanged.

The optical relay between the galvos has quite a long path, so to economise on space, it has been folded. The fold requires a lateral displacement to avoid clashes between the input and output beams, so this is achieved with a 90 degree 'roof' pair of mirrors 10. This gives the opportunity to introduce a system focus adjustment to ensure that the laser spot can be focused in the sample image plane. A simple screw-driven slide allows the pathlength between relay lenses to be changed in order to effect the focus.

A choice of three laser spot sizes is accomplished by changing the beam diameter at the input of the FRAP module. Because this is a Gaussian diffraction-limited optical system, a greater input beam diameter results in a smaller focused spot size. Initially, the input beam size can be determined by appropriate selection of the focal length of the collimator lens at the end of the fibre. This may be 0.7 mm, for example.

The beam diameter is variable automatically using motorised beam expanders 4, 5. These are essentially Gallilean telescopes which can expand or contract the beam diameter. Front and rear telescope lenses are each mounted on a three-position rotary selector, to give a choice of two alternative lenses or 'no lens'. In combination, these provide currently a straight-through configuration, a 3 times beam expander and a 3 times beam contractor.

Each lens pair is mounted on a shaft driven against end-stops using the same motor employed in the optical switch module. Extraordinary care is taken to keep the lens assembly symmetric so that lenses centre up accurately and reproducibly. End-stop bias is organised to take up bearing slop in the focus direction which is least critical. A magnetic detent holds the assembly against gravity or other off-centre forces in the much less critical straight-through configuration.

Even after taking care with the telescope centering, the laser beam may not necessarily arrive on centre. For that reason, the collimator barrel of the input fibre is adjustable in both lateral displacement and pointing direction. A four screw adjustment accessible from outside the module is provided for this purpose. Lack of centration in the beam expansion telescopes affects primarily the beam pointing at the exit of the FRAP module and the f-theta lens is inadequate for this purpose.

The inventors have determined that the input pointing can be adjusted so as to compensate for any lack of centration agreement in the beam expansions, at least insofar as output pointing is concerned. It takes a careful iterative routine to align the four input adjuster screws correctly so that all three beam configurations coincide at the rear of the microscope objective. This adjustment may be awkward for a service engineer, since currently a separate camera is needed as an alignment aid. The problem may be overcome by providing the fibre integral with the module so that realignment will not be needed. Alternatively, test software and a simple optical fold-back accessory may be provided to allow the system to be realigned more easily using the system's own camera.

Control of the FRAP beam power using the laser source is relatively coarse so additional control may be provided in the form of a 3-way switched attenuator 7. This works like the beam expansion lenses but does not require such reproducibility since the attenuators have no optical centre. 1 and 2 OD attenuators may be used, for example, or more preferably 2 and 4 OD attenuators.

The exact relationship between the galvo command voltages and the location of the laser spot in the sample image plane is of course dependent on many build factors. Indeed, a fixed physical relationship between the two is not necessarily required: rather the target location should preferably agree with the location as nominated from a viewed image of the sample (WYSIWYG). This entails the viewing optics also. However, it does not to first order involve the microscope since the FRAP and viewing systems become common at the image plane at the front of the FRAP module. As a result it is possible to calibrate the system by placing a target at this image plane, using a motorised flip-down target 21, for example. This has the advantage that the user's cooperation is not required for calibration and his sample remains unaffected by the calibration procedure.

Rather than FRAP our internal target, the laser spot on the target may be viewed simultaneously through the viewing system. This requires that the injection mirror 16 be actually a beamsplitter in order to allow radiation to be returned. In the prototypes, a 50:50 beamsplitter has been used, but preferably it is a 90:10 beamsplitter. This keeps the FRAP efficiency high but still allows enough return for calibration.

Currently, the calibration target is a mirror 21. This has the advantage of being robust and reliable but has the disadvantage that it returns light of the same wavelength as the FRAP laser. This is potentially the exact wavelength that the confocal head is intent on blocking. In practice, enough breakthrough can be detected to enable the calibration, but as a fall-back, one can if necessary substitute a fluorescent screen. This could be a transparent fluorescent plastic or else an opaque film. In either case, a suitable colour is day-glo orange. The disadvantage of a fluorescent target is that it emits in all directions, and may scatter the laser beam, which tends to make the return spot rather indistinct, and in addition, the fluorescence will have a limited long-term life which may well cause problems.

Calibration consists of recording through the viewing system a spot pattern generated by a preset list of galvo drive values. A suitable mathematical transform can then be computed to convert galvo coordinates into camera coordinates and vice versa. Typical factors to be taken into account include X & Y offset and scale factors, axis rotation and non-orthogonality. Despite care to design a linear relationship between galvo voltage and spot displacement, the viewing system itself may show some non-linear optical distortion (barrel distortion) and second order non-linear terms are desirable in the calibration to give sub-pixel accuracy in the aiming.

Axis rotation may be included in the software calibration rather than provide mechanical adjustments. Nevertheless, it is still the case that the FRAP unit can be rotated around the viewing axis. The advantage would be if the preferential alignment of the X scan vector considerably facilitates raster scanning to a substantial extent.

The calibration may change over time so recalibration may be needed. In normal use, one might expect the X & Y offsets to drift, since the galvos have a noticeable temperature coefficient. The scale factors and higher order terms should however remain relatively stable and the rotational parameters should be subject only to substantial physical perturbation of the system. It should be adequate to do a full recalibration only at instrument start-up and that prior to any FRAP experiment, only the X & Y offsets should be remeasured. This may only take up to about 1 second to carry out. The system should then be sufficiently stable to keep its alignment accurate for the entire duration of a typical experiment. However, this probably depends upon having the system properly warmed up and the ambient temperature under reasonable control.

As originally laid out, the FRAP optical system was inconveniently large. Consequently, in a preferred embodiment it has been very carefully folded using four flat mirrors 3, 6, 13, 15, to fit into a volume very similar to the size and shape of the confocal head. Local drive electronics for all the motors and separately the galvos, may be contained within the module and the heat generated, especially from the galvos, may require heat sink fins on the case in order to dissipate the heat. The motors may be identical to the optical switch motor and similarly driven (but note the magnetic detent on the 3-way selectors).

The services for the module—optical fibre, electrical power and control signals—may all be arranged to emerge from the rear. At the front of the module, there is an LED to indicate that the FRAP system is potentially laser-active, and there is also a manual shutter control to blank the laser beam for safety reasons. The package has three adjustable levelling feet. Note that these are a convenience feature for installation purposes and can be raised after installation is complete. They may though be employed to stabilise any tendency for the FRAP module to rotate.

All service adjustments are externally accessible and comprise: the four input adjusters and the focus adjust on the microscope end of the unit; and adjustment screws for the f-theta lens, one on the top and one at the back.

Figure 5:
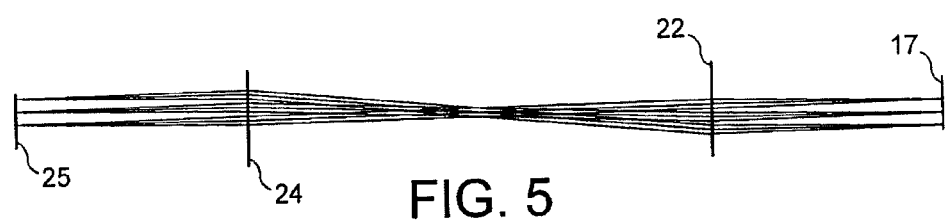

FIG. 5 is a schematic ray diagram of the main viewing relay. Both the first and second lenses 22, 24 have the same focal length f, giving a 1:1 relay. Spaced 2f apart, the lenses in combination replicate the optical field at the sample image plane 17, a distance f away from the input lens, in all significant respects at relayed sample image plane 25, a distance f away from the output lens.

Figure 6:
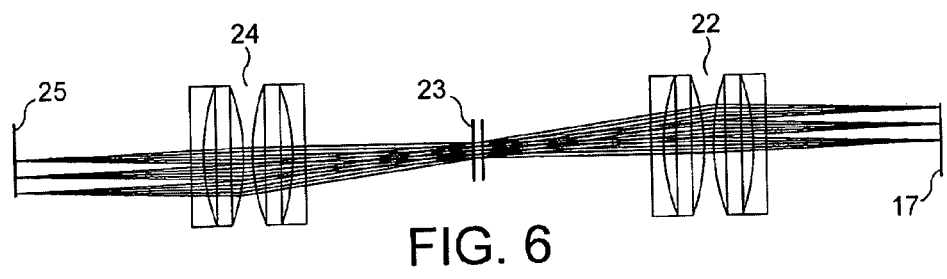

FIG. 6 is a ray diagram of an implementation of the main viewing relay. The aberrations in practical (spherical surface) lenses limit the degree of refraction available for accurate imaging, with the result that using simple lenses, the relay must have a long focal length in order to maintain a good image. Each individual lens is replaced with a pair of lenses 22, 24, sharing the refraction between surfaces in order to shorten the relay and yet maintain good imaging. Each lens is itself an achromatic pair which in addition to correcting the chromatic aberration, again tends to improve the image quality. Even so, the image quality is critically dependent upon the numerical aperture presented by the telecentric input beams. This can be controlled upstream of the relay input or alternatively can be controlled by the central aperture defined by baffle 23 as shown. This aperture may also serve to limit stray light from propagating through the relay.

Figure 7:
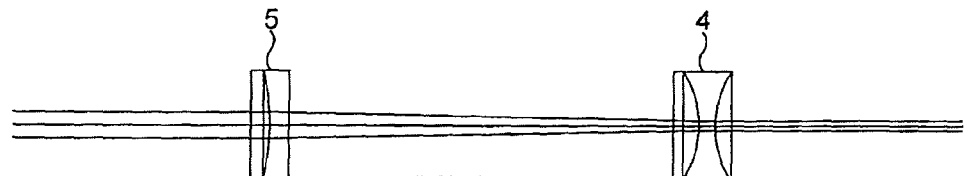

FIG. 7 is a ray diagram of the beam expander telescope. The narrow parallel beam (0.7 mm diameter) entering at the right is expanded by a factor of 3 to an output parallel beam on the left. The lenses 4 and 5 have focal lengths of −25 mm and 75 mm, respectively, and are placed so that their focuses are substantially coincident. The lenses are achromats both for colour correction and for improved image quality.

Figure 8:

FIG. 8 is a ray diagram of the alternative beam contractor telescope. The narrow parallel beam (0.7 mm diameter) entering at the right is contracted by a factor of 3 to an output parallel beam on the left. The lenses 4a and 5a have focal lengths of 75 mm and −25 mm, respectively, and are placed so that their focuses are substantially coincident. Again, the lenses are achromats both for colour correction and for improved image quality.

Figure 9:
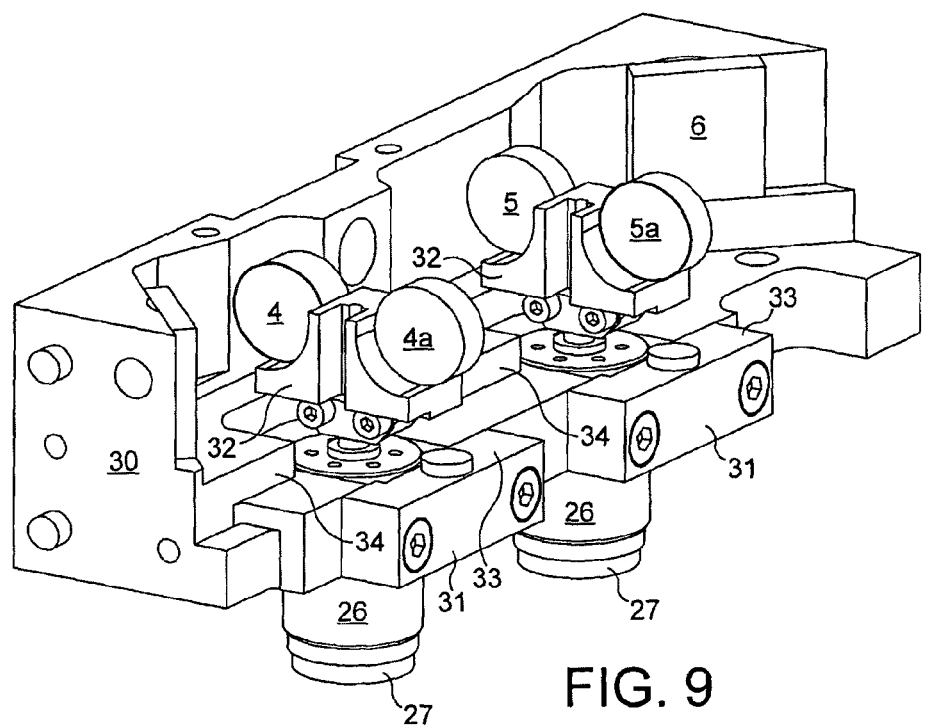
FIG. 9 is a perspective of a motorised telescope assembly forming part of the light input assembly of FIG. 2.
Figure 10:
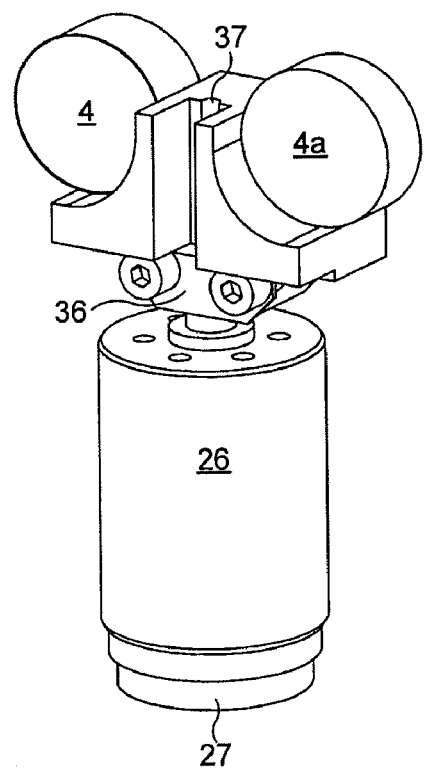
FIGS. 10 and 11 are perspective views of opposite sides of motorised lens mounts forming part of the telescope assembly of FIG. 9.
Figure 11:
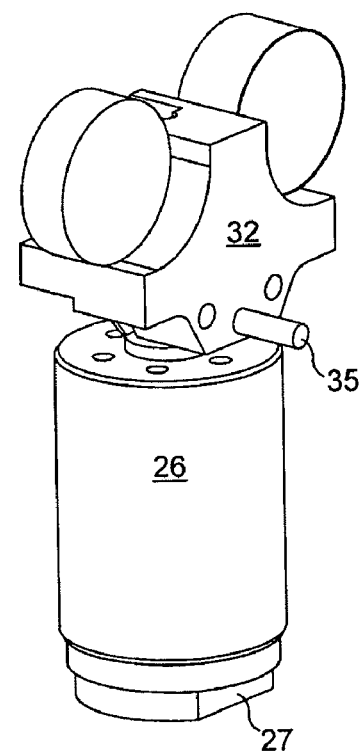

A motorised telescopic assembly for manipulating the telescopes is illustrated in FIGS. 9 to 11, with features denoted as follows:

| | |
|---|---|
| 4, 5; 4a, 5a | telescope lens pairs |
| 6 | fold mirror |
| 26 | DC motor |
| 27 | rotary encoder |
| 30 | sub-frame |
| 31 | clamp plate |
| 32 | lens mount |
| 33 | magnet |
| 34 | end-stop |
| 35 | end-stop pin |
| 36 | clamp plate |
| 37 | V-bottomed slot |

The centration of the beam expander telescope lenses is crucially important to achieving coincidence of the three laser beam sizes at the rear aperture of the microscope objective, in spite of the provision of the method of input alignment designed to bring the beams into coincidence. If the lateral position error in any of the telescope lenses is too large, the resulting pointing errors may be too much to accommodate within the practical range of the adjustments. Hence the symmetry of the lens mounting is of great significance, in particular, the optical centres of each pair of lenses on each mount (4, 4a; 5, 5a) should lie equidistant from the axis of rotation.

The mount 32 is designed to reduce centration errors to a minimum. Specifically, the mounting surfaces for the lenses and for the axle are all machined by milling from the same side without any change of machine tool setup being required. This strategy makes the best use of the inherent accuracy of the milling machine. For example, the normal practice would be to drill a hole down the vertical axis of the mount in order to take the motor shaft. This requires turning the workpiece, which may result in additional setup errors, and in any case may result in an off-centre hole simply due to drill wander Instead, a V-bottomed slot 37 is milled in a preferred embodiment to accommodate the motor shaft, clamping the shaft in place with a plate 36, thereby guaranteeing excellent symmetry in the lens mount.

A further feature designed to encourage centration symmetry is the end-stop pin 35. This pin is held against the sub-frame 30 by deliberate torque in the DC motor 26 at the end-stop locations 34 (only one of which is visible), thereby defining the two positions in which the telescopes are active. The reaction force on the motor shaft then biases the bearing in a direction parallel to the optical axis of the lens. Thus any free play in the motor bearings is accommodated in the focus direction which is least sensitive. If the body of the lens mount was used as an end-stop instead, then the reaction force on the motor shaft would have a strong component transverse to the optical axis thereby disturbing the centration.

The end-stop pin 35 serves a secondary purpose. The motor can be driven to the half-way position between end-stops and in this location, neither lens is in the beam. This gives the 1× beam expansion option with no telescope in the beam. However, the motor has no brake and remains free to rotate out of this position under the influence of gravity or any other unwanted force. The pin 35 however is made of a magnetic steel and in the mid-position is attracted by the magnet 33, forming a weak detent action which holds the motor approximately in the proper location.

The beams used in this system are single mode laser beams with a Gaussian cross-section. For the most part, the optics are entirely diffraction limited. It is well known that light cannot be focused to an infinitesimally small spot: the size of the spot is limited by diffraction. The limiting spot size is determined by the wavelength of the light in conjunction with the angle of convergence of the light being focused. For a given wavelength, a smaller spot is achieved with a larger angle of convergence and vice versa. In the case where a simple lens focuses a parallel beam of light to a spot approximately one focal length away, the angle of convergence will increase with the diameter of the parallel beam. Hence in such a system, provided that it remains diffraction limited, a large diameter input beam will give rise to a small focused spot and vice versa. In the case of Gaussian laser beams, the literature states that the spot size is related to the convergence angle according to the following formula:

$$r/f = \theta = \lambda/(\pi * w_0)$$

Here r is the parallel beam radius, f is the focal length of the lens, $\theta$ is the angular radius of convergence, $\lambda$ is the wavelength and $w_0$ is the radius of the spot. In all cases, radius refers to the $1/e^2$ radius of the Gaussian beam profile.

Figure 12:
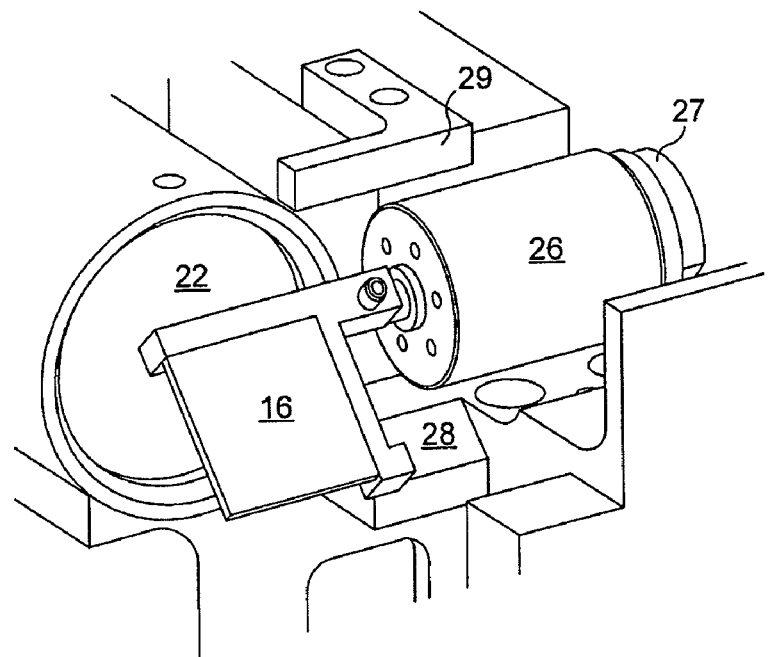
FIGS. 12 and 13 are perspective views of a motorised beamsplitter assembly forming part of the light input assembly of FIG. 2, showing the beamsplitter inserted in and removed from the light beam, respectively.
Figure 13:
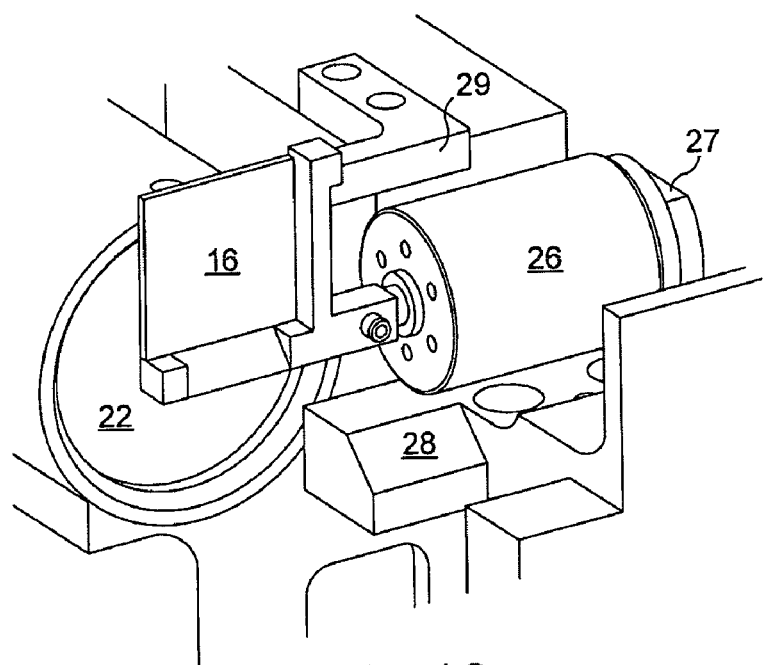

FIGS. 12 and 13 show a high speed motorised beamsplitter assembly according an embodiment of the invention, with the beamsplitter inserted and removed from the light beam, respectively.

The beamsplitter 16 is a square of glass 1.1 mm thick and 16 mm across coated on its first surface with a dielectric coating giving around 90% reflectivity and 10% transmittance. The rear surface is anti-reflection coated so that ghost reflections are reduced to an acceptable level. Inserted into the main viewing beam at 45 degrees (FIG. 12), the beamsplitter injects most of the targeted illumination beam into the microscope. However, when the calibration mirror 21 is inserted, some of the beam is reflected back through the beamsplitter. About 9% is transmitted back through the confocal head to the camera allowing the system to calibrate the aiming of the laser beam.

For normal viewing, the beamsplitter can be rotated out of the beam where it can have no effect on the quality or intensity of the viewed image (FIG. 13). The effects of targeted illumination may be very short-lived in some cases and consequently, the speed of the changeover from targeted illumination to normal viewing is of critical importance. Rotation of the beamsplitter between lower and upper end-stops 28, 29 is driven by a DC motor 26 with a rotary encoder 27 to monitor its rotation. For the very fastest operation, the motor is driven at full current, giving maximum acceleration, until the beamsplitter has been rotated halfway to its alternate location. By this time the viewing beam is now clear for viewing. Next the drive current is reversed giving maximum deceleration. As a result, the rotation speed is quite low after a period equal to the previous acceleration period. A relatively small residual reverse drive current then ensures that the beamsplitter reaches its end-stop without risk of serious damage from a high-speed collision with the end-stop.

The embodiments of the module optics described herein may be constructed (and have been successfully prototyped) using catalogue optical components: lenses from Edmund Optics; dielectric mirrors from Comar; and absorptive neutral density filters from Thor. The primary supplier for the modules is QiOptiq in Singapore (previous Thales). However, some potential deficiencies in catalogue parts in relation to this particular application indicate it may be preferable to use custom optical components. The main deficiencies of the catalogue parts could be as follows. The lenses are not chromatically optimised for the wavelength range specified for the system and the general purpose surface figure leads to some elliptical distortion and blurring of the beam. The spectral range of the glasses used in the lenses does not allow much future extension into the UV and also, the coatings are not very efficient at the ends of the range. A 90:10 beamsplitter of a suitable form is not readily available and the mirrors and the beamsplitter may show occasional point defects that may significantly perturb the beam quality at various points in the field.

The custom optics may therefore preferably be configured to address these possible deficiencies. The glasses may be selected to have transmission well into the UV (at least 350 nm). The surface quality of all the components may be tightly specified. The reflective and AR coatings may all cover the desired range rather efficiently and the lenses have figure optimised to minimise elliptical distortions and general degradation of the beam. The neutral density filters (attenuators) may be replaced with reflective filters instead.

Alignment of the 3 Expanded Laser Beams

All three various sizes of laser beam should pass through the centre of the rear optical aperture of the microscope objective. This ensures that the cone of illumination reaching the sample is locally parallel to the optical axis and also guarantees that the maximum amount of light passes into the objective. The f-theta lens 14 is used to aim the output beam from the targeted illumination module; however this one-time adjustment must suffice for all three choices of beam size, so it is important that all three beams coincide at the rear of the objective. In a perfectly built system, this would be the case. However centration errors in the telescope make this impractical to achieve by direct assembly methods. Nevertheless, using all 4 degrees of freedom available in the input laser beam adjuster, it is possible to find a single input path that substantially achieves beam coincidence at the rear of the objective. This can be demonstrated by classical optics as follows.

In the properly telecentric optical system as proposed here, the field lens 19 guarantees that the rear objective aperture images at infinity relative to the sample image at 17. Working backwards through the system, the f-theta lens 14 focuses this infinite conjugate on to the Y galvanometer mirror 12 from where it is relayed to the X galvanometer mirror 8. The X galvanometer is therefore at an image of the rear aperture of the objective which is the target. So if the laser beams are coincident at the X galvo mirror, they will be coincident at the rear of the objective.

One can work backwards through the telescope assembly to see where the galvo reimages. This is different for the three beam expansion possibilities and each variation is shown as FIGS. 14A to C, respectively, where the beam spread has been grossly exaggerated to help with the illustration.

Figure 14A:
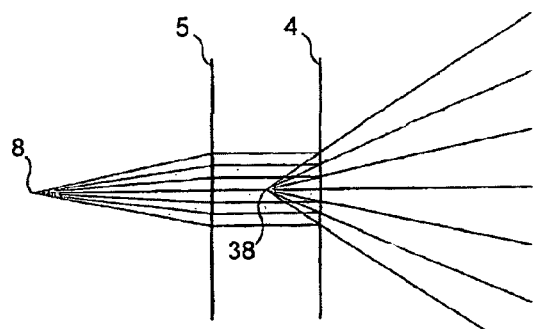
FIGS. 14A to C, 15, 16A, 16B, 17A and 17B show ray diagrams illustrating adjustment of the light input assembly optics to address any misalignment of the telescope lenses.
Figure 14B:
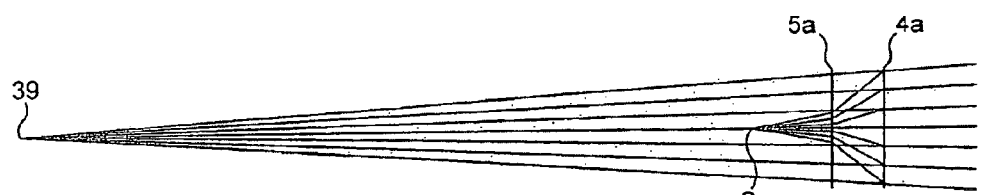
Figure 14C:
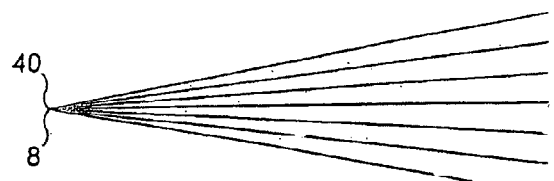
Figure 15:
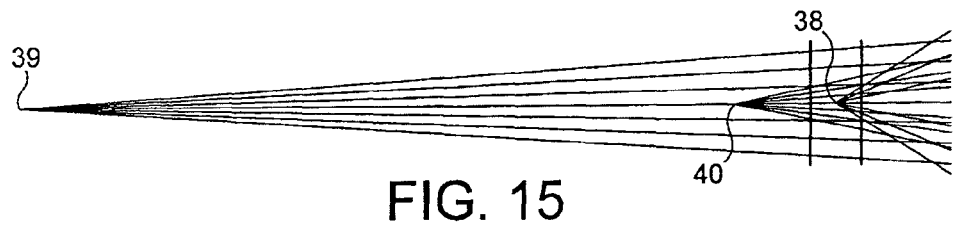
Figure 16A:
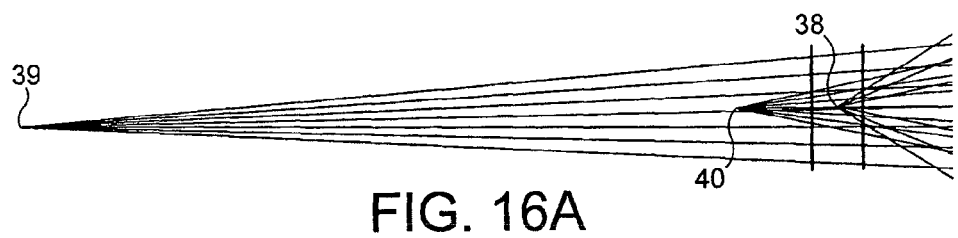
Figure 16B:
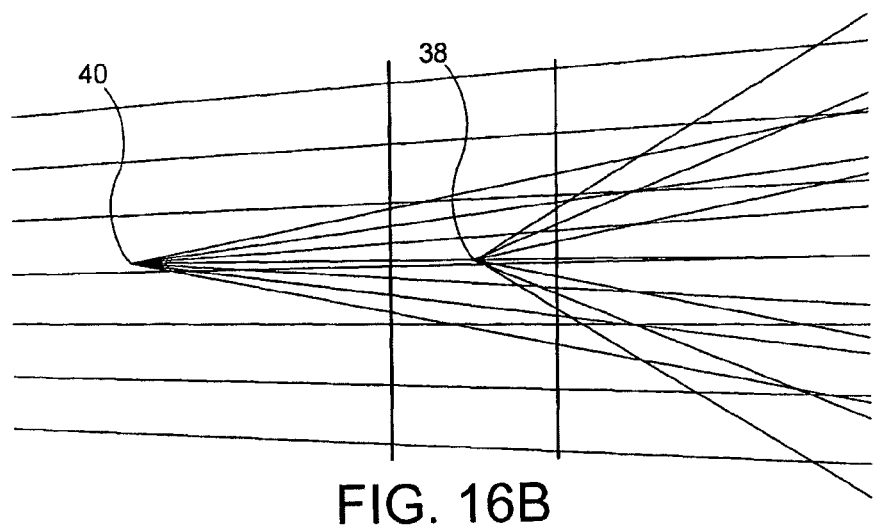
Figure 17A:
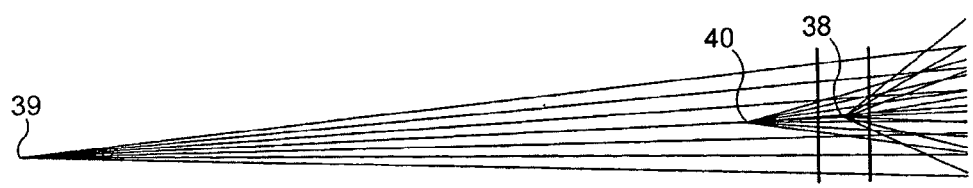
Figure 17B:
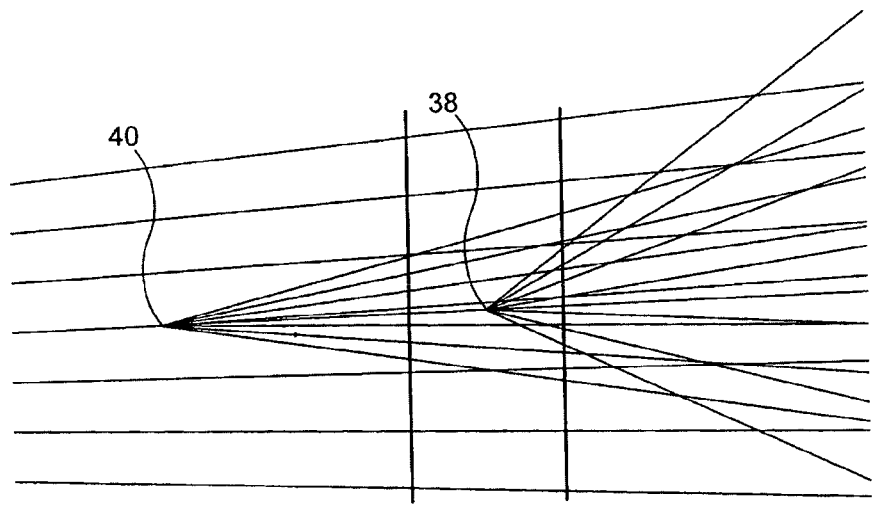

Reverse ray traces depicted in FIGS. 14A to C indicate the location of the virtual images of the centre of X galvanometer mirror 8 as follows:

38 virtual image location with 3× beam expander in FIG. 14A
39 virtual image location with ⅓× beam contractor in FIG. 14B
40 virtual image location with 1× beam expansion (no telescope) in FIG. 14C The ray traces from virtual focuses 38, 39 and 40 shown in FIGS. 14A to C are shown in FIG. 15. The effect of a 1 mm offset in telescope lens 4 on the ray traces of FIG. 15 is shown in FIG. 16A, with an enlarged view of part of FIG. 16A provided in FIG. 16B. It can be seen that image point 40 has moved off-axis in FIGS. 16A and B, and as a result image points 38, 39 and 40 no longer lie in a straight line. FIGS. 17A and B illustrate the corrective effect of shifting the object, bringing 38, 39 and 40 into line again.

In order for the laser beams to be coincident at the X galvo, one can see that the laser beam should pass virtually through these three virtual focuses 38, 39 and 40. In other words, at the input one should aim the laser so that in the absence of any beam expander it would pass through the points 38, 39 and 40. This is of course only possible if the three points lie in a straight line. Unfortunately, one can also see that if any one of the lenses is for any reason laterally displaced (as exemplified by FIGS. 16A and B), the points will not lie in a straight line and hence the aim cannot be achieved.

However, the situation can be recovered by adjusting the target point on the X galvo. In the Figures, this is equivalent to shifting the object which will in turn shift all three images. The transverse magnifications are different for the three different beam expansions and hence the image spots 38, 39 and 40 move at different rates. Since in general, the longitudinal separations of the images are not in proportion to the magnifications, the relative alignment of the spots also changes. This makes it possible to bring the three spots back into line again (as shown in FIGS. 17A and B).

In the example illustrated, it required a 5 mm shift of the object to compensate for 1 mm shift of lens 4. Fortunately, one could expect to achieve centration agreement to with about 0.2 mm so a target shift of 1 mm should be adequate. Note that although coincident at the galvo, the laser beams are now off centre by 1 mm or so. This however can easily be compensated by adjusting the f-theta lens also by 1 mm.

Note that although the laser beams are now coincident at the rear of the objective, they are most likely no longer coincident at the sample image plane 17. However, since the X and Y galvo mirrors steer the beam to any desired location in the sample image plane, this problem can be corrected by software calibration of the individual beams.

Figure 18:
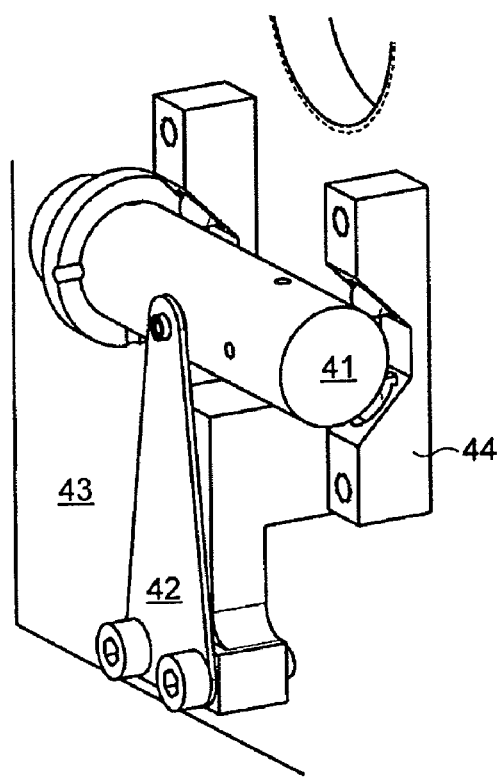
FIGS. 18 and 19 are perspective views of an input beam adjustment mechanism forming part of the light assembly of FIG. 2.
Figure 19:
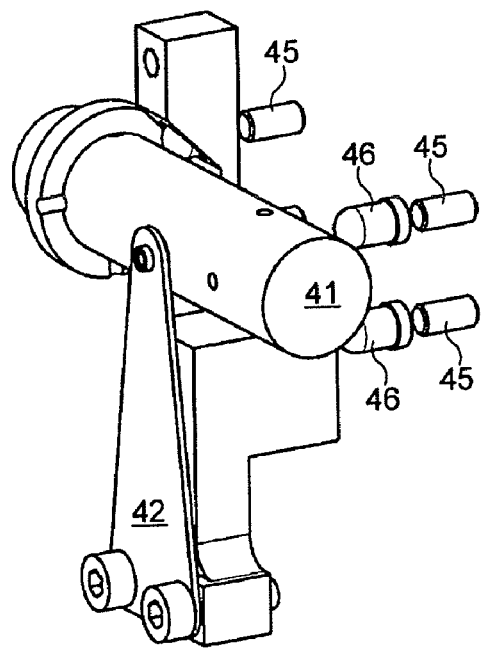

Even if the telescope lenses were perfectly centred, there would still remain the problem of aligning the laser accurately with the optical axis of the telescopes. With inevitable centration errors, the problem changes to one of aiming the laser to pass through the 3 virtual focuses. One can use an iterative method of adjustment using for example the input beam adjustment mechanism shown in FIGS. 18 and 19, in which features are denoted as follows:

| | |
|---|---|
| 41 | laser beam collimator barrel |
| 42 | clamp and return spring |
| 43 | inside of enclosure wall |
| 44 | push-pin guide assembly |
| 45 | adjustment screws (4 in total) |
| 46 | spherical ended brass push-pins (4 in total) |

First, all of the adjustments are set to their nominal centres: the 4 input adjusters 45, the X and Y galvos, the focus adjust and the f-theta lateral adjustments. This ensures that the laser beam passes cleanly through the system, approximately down the optical axis. Next, the laser output of the targeted illumination module is viewed at infinity relative to the sample image plane 17. This is most easily done by viewing the output at the C-mount 18 using a digital camera focused at infinity.

Now note the location of the spot generated by the 1× beam expander (no telescope, medium beam) and the spot generated by the ⅓× beam contractor spot (small beam) and observe that they are displaced from each other. Adjust only the two distal input adjustment screws (relative to the telescopes) so as to bring the small spot into coincidence with the medium spot. This will require some iteration since the adjustment also affects the medium spot.

Now observe the locations of the medium spot and the large spot (from the 3× beam expander). Adjust them into coincidence using only the proximal input adjustment screws. Adjusting the proximal screws also affects the coincidence of the medium and small spots and it will be necessary to iterate around the entire sequence repeatedly until all three spots converge to the same centre. It is important that when aligning the small and medium spots only the distal screws be adjusted and when aligning the large and medium spots only the proximal screws should be adjusted. Otherwise, the alignments may diverge instead of converging to coincidence. After the spots have reached coincidence, they can then all be centred in the rear aperture of the microscope objective using the f-theta lens adjustments.

At first sight, it might appear that the distal screws perform exactly the same function as the proximal screws, namely changing the input angle, but in fact, the iteration of the adjustments typically has the effect of walking the laser beam sideways. Indeed, it would be possible to devise an adjustment method that recasts the adjustments as a lateral shift and an angular shift.

Note also that small spot at infinity corresponds to low beam divergence and hence a large spot at the sample image plane 17. Similarly, a large spot at infinity corresponds to a small spot at 17.

A digital camera can be employed at the output of the targeted illumination module to effect this adjustment. A useful alternative is to place a concave mirror at one focal length away from the sample image plane 17 so as to focus infinity onto 17. This allows the system camera to be used for the adjustment. Such a mirror is easily simulated using a convex lens of twice the focal length, backed by a plane mirror.

Figure 20A:
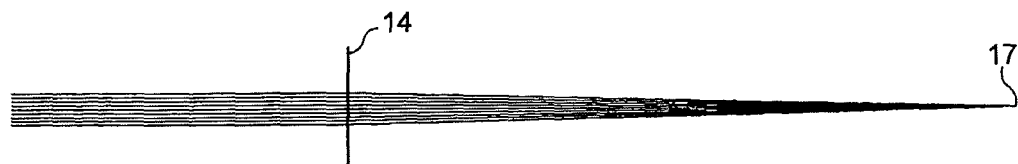
FIGS. 20A and 20B, and FIG. 21 are two ray diagrams and a perspective view respectively illustrating adjustment of an f-theta lens forming part of the light input assembly of FIG. 2.
Figure 20B:
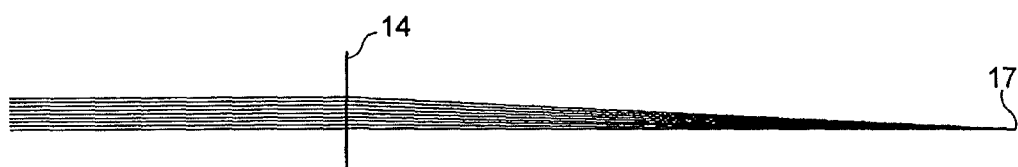

The f-theta lens 14 has three discrete functions: it converts angular deviation of the beam at the galvanometer mirrors to parallel displacements at the module output (around the C-mount flange 18); it focuses the laser beam at the sample image plane 17; and it can be adjusted to steer the direction of the output beam so that the beam passes directly through the centre of the rear aperture of the microscope objective. The principle of this last function is illustrated by FIGS. 20A and B. In FIG. 20A, the f-theta lens 14 is centred on the laser beam and as a result passes undeflected through the lens save for the desired focusing effect. In FIG. 20B, the lens has been displaced vertically downwards resulting in the downwards deflection of the output beam. Clearly, this action can be extended to give horizontal deflection also allowing two orthogonal degrees of freedom in the pointing of the output beam.

Figure 21:
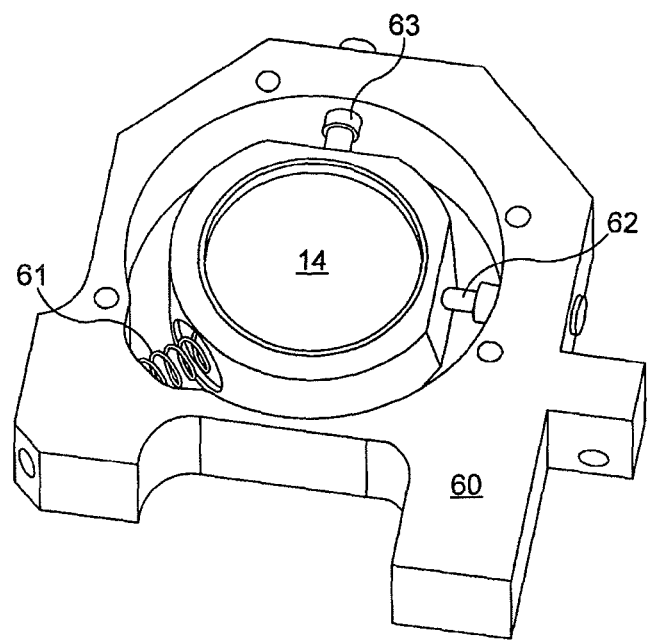

An adjustment mechanism facilitating adjustment of the f-theta lens position in two orthogonal directions is shown in FIG. 21, with features identified as follows:

| 60 | housing |
| 61 | return spring |
| 62 | horizontal adjustment screw |
| 63 | vertical adjustment screw |

The purpose of the galvanometer relay formed by lenses 9 and 11 in FIG. 2 is to image the X galvo mirror 8 onto the Y galvo mirror 12. This has the effect of making the two mirrors appear to be co-located. Consequently, the system has only one deflection centre instead of two, making the job of the f-theta lens much easier.

The practical consequence of omitting this relay is that the output beam cannot be guaranteed to pass through the centre of the rear aperture of the microscope objective for all galvo deflections. The reason for using a relay instead of just a single lens is so that the parallelism of the laser beam is unchanged at the exit of this subsystem.

Figure 22:
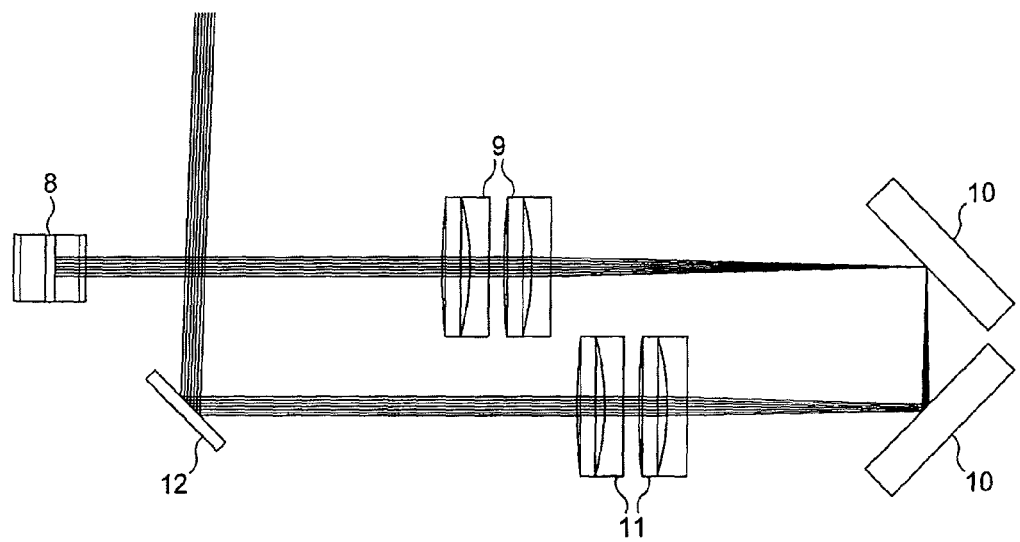
FIG. 22 is a ray diagram illustrating an optical relay associated with the beam directing means of the light input assembly of FIG. 2.

The relay is 1:1 with a classical 1f:2f:1f spacing but is preferably implemented with lens pairs to reduce aberrations in the refraction, as illustrated in FIG. 22.

The pair of plane mirrors 10 in a 'roof' configuration folds the system making it physically shorter. However, it also serves as the system focus adjustment. When displaced laterally (left-right in FIG. 22), the parallelism of the output beam changes from converging, through parallel to diverging. This affects the beam focus at the sample image plane 17 and allows the beam to focused accurately for the most critical application, namely with the 3× beam expander which generates the smallest spot. The focus for the other beam choices is not so accurate but this is less critical. The roof pair may be driven by a simple screw slide mechanism.

Optical Switch

The function of the optical switch (identified as 110 in FIG. 1) is to divert the laser beam at will from the normal confocal head viewing channel into the FRAP channel. The switch is sited in or close to the laser source 108 and its outputs are coupled to the confocal head 102 and FRAP module 100 through armoured single mode optical fibres.

In the case of 6-line and 3-line laser sources, the optical switch module is mounted actually inside the laser source module and the input is coupled directly to the laser beam, since this is the most efficient arrangement. However, in the case of the 5-line combiner, because of space problems the switch is mounted externally and its input is coupled to the laser via another single mode fibre terminated at each end with a collimator.

Figure 23:
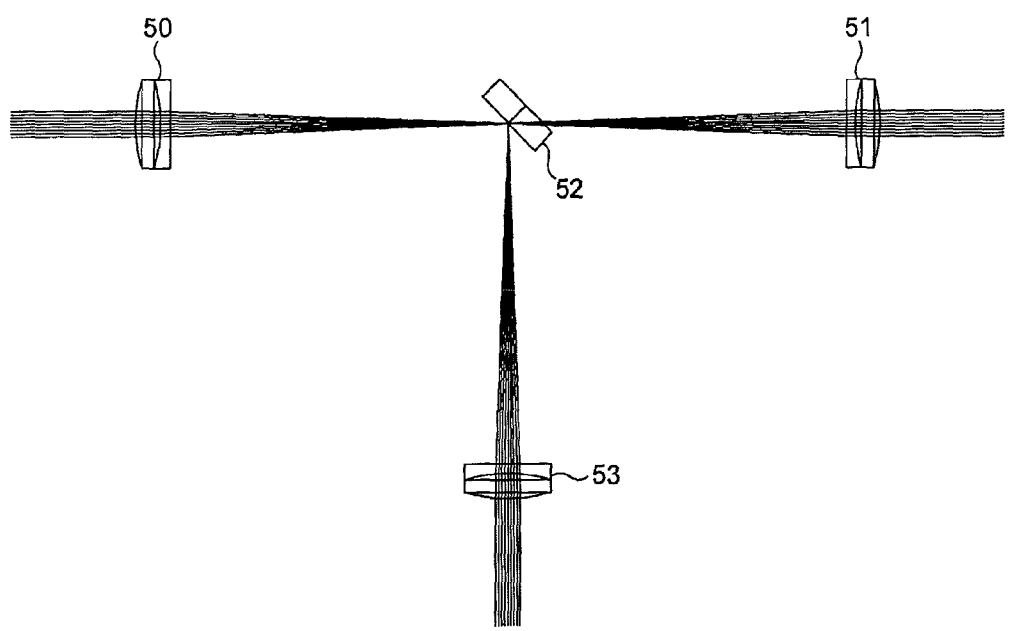
FIGS. 23 and 24 are a ray diagram and a perspective view, respectively, of an optical switch of the system of FIG. 1.
Figure 24:
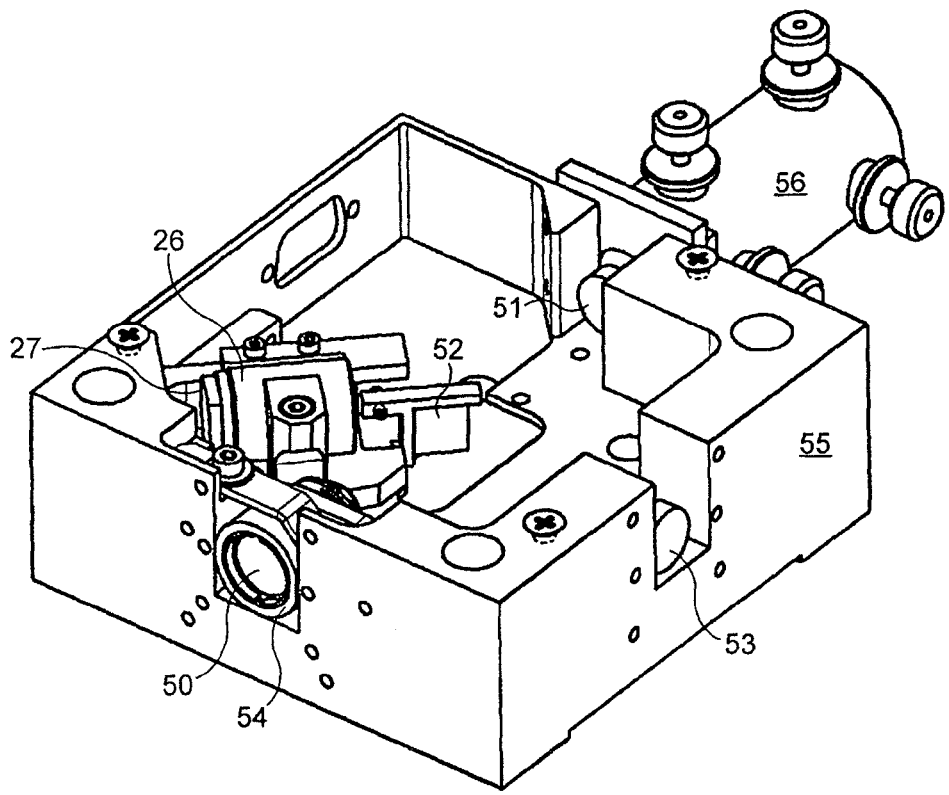

FIG. 23 depicts schematically the optical elements of the switch (with the beam width exaggerated for the purpose of illustration), whilst the construction of an implementation of the switch is shown in FIG. 24. Features are denoted as follows:

| 26' | DC motor |
| 27' | rotary encoder |
| 50 | input lens |
| 51 | output lens (when mirror absent) |
| 52 | motorised plane mirror (shown inserted) |
| 53 | alternative output lens (when mirror inserted) |
| 54 | focus ring on input lens |
| 55 | housing |
| 56 | micromanipulator for alignment of collimated output fibre |

The switch itself is fundamentally a motor-driven plane 'flag' mirror 52 which deflects the beam from its normal straight-through path for the confocal channel, through 90 degrees to the FRAP channel. The usual collimator barrel termination, complete with micromanipulator 56 for alignment, couples the light into each output fibre.

In this basic arrangement, in order to achieve good reproducible transmission efficiency, the switch mirror angle has to be exquisitely reproducible. The underlying reason is that at this point, the laser beam would normally have under 0.5 milliradian divergence and the tight coupling into the fibre demands that the angular alignment be kept within about $\frac{1}{10}^{th}$ of this angle. The problem is solved by increasing the divergence in the area of the mirror. For this we use a focusing lens 50 at the input and a collimating lens 51, 53 at each of the outputs. The transmission efficiency especially for confocal viewing in the straight-through mode needs to be very high and since the exact character of the input laser beam from the laser source is slightly indeterminate and the focal lengths of the lenses are not perfectly controlled, there is a screw-action focus adjustment 54 on the input lens.

The motor 26' is a direct drive DC type with a rotary encoder 27', operating the mirror between two end-stops approximately 90 degrees apart. The drive control is a locally placed electronic card with a microprocessor to control and monitor the acceleration. The operating principle is to accelerate flat out for 45 degrees, followed by equal and opposite deceleration so that the mirror arrives at its end stop relatively gently and without bouncing too much. A significant hold current then biases the mirror against the appropriate end stop. Note that this force also biases the bearings into a reproducible configuration, eliminating sideways bearing play. The magnitude of the hold current is critical for reproducibility of the mirror angle in the FRAP output configuration.

The user requirements call for optimised switching from FRAP mode to viewing mode and since it is potentially rather faster to remove the mirror from the beam rather than to place it accurately on an end stop, the FRAP channel is coupled to the 90 degree configuration. The required switching time is under 50 msec but the motor is capable of clearing the beam in under 10 msec. The return switching time is less critical and is in the 20-30 msec range.

The optical switch is required to couple single mode laser radiation from either a free space laser or a collimated single mode fibre into one of two alternative outputs each of which is a collimated single mode fibre. The alignment conditions for good transfer efficiency in such a system are typically very stringent. For example, a typical beam from a commercial single mode laser has a divergence of around 1 milliradian and in order to maintain good coupling efficiency, the alignment of the beam with the collimated fibre must be around $\frac{1}{10}^{th}$ of this angle or around 30 arc seconds. To maintain this degree of accuracy in a mechanical system is difficult: for example, 30 arc seconds of beam deviation corresponds to a deflection of a mere 0.5 micrometres in a pivoting mirror of length 10 mm.

The tolerance to angular misalignment can be improved by increasing the divergence in the laser beam. However, coupled to this increase, there is a necessary decrease in beam diameter due to the diffraction-limited nature of single mode laser beams. Thus, the beam divergence cannot be increased inordinately, otherwise the tolerance in lateral positioning of the beam will become unmanageable.

Since commercial single mode laser beams and collimated optical fibres seem to be geared around a diameter of about 1 mm, an optical scheme has been devised that increases the associated divergence within the optical switch but for convenience leaves it unchanged at the input and outputs. The input lens 50 and the output lens 51 together form a relay which transfers the input to the output relatively unchanged but focuses the beam within the switch at a point close to the mirror. This reduces the sensitivity to angular misalignment within the switch making the mechanical design of the motorised mirror 52 very much easier so that when the output is diverted through lens 53, good efficiency can be maintained despite any small errors in the mirror position.

Alignment of the output fibres remains unchanged and therefore may still require a sensitive mechanism such as the 4 adjustment micromanipulator 56 illustrated on the direct output and usually present on the alternative output also. In applications where the 'straight-through' coupling efficiency is most important, in order to optimise it and compensate for any variations in build dimensions, input lens may be incorporated within a simple screw focus mechanism 54.

Instead of the optical switch configuration described above, its function may be implemented using a switch based on a ferro-electric polarisation rotator and a polarising beam-splitter. Alternatively, a piezo-actuated precision ball slide with a 45 degree mirror could be employed.

Electronics

The hardware implementation for controlling laser beams in three axes around a sample will now be described. The beam may be steered around an area of interest in predefined shapes or freehand operation (FRAP). Concurrent control of the X,Y axis and laser power on/off, and the drawing of shapes in high detail is also set out.

System Description

Figure 25:
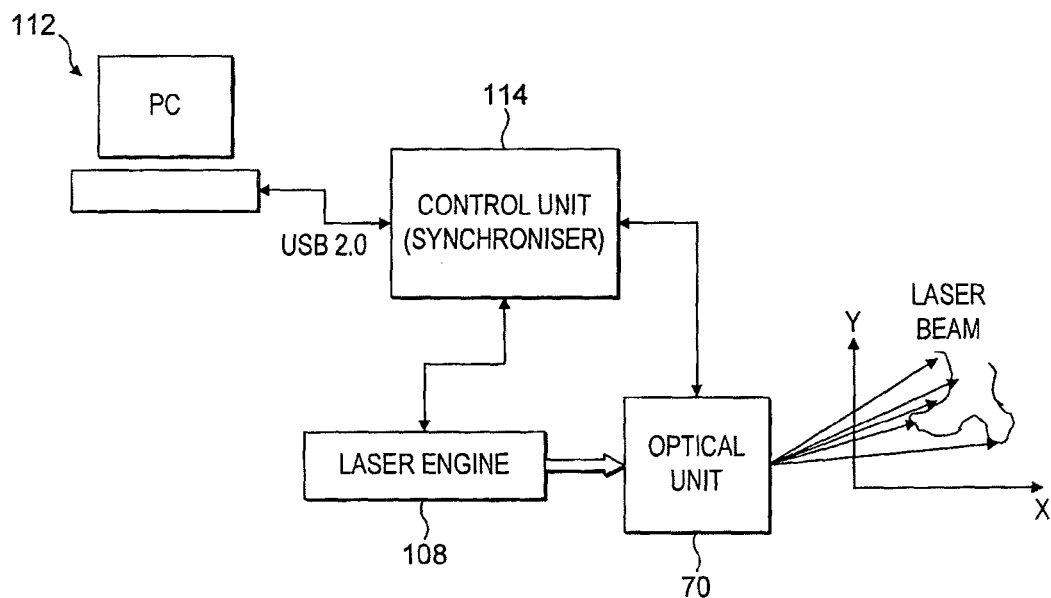
FIG. 25 is a block diagram illustrating electronic components of the targeted illumination aspects of the system shown in FIG. 1.

The main parts of the system are the Control unit (Synchroniser 114), the Optical unit 70 (which includes targeted illumination module 100), laser engine 108, and a PC 112 (see FIG. 25). Other components of the microscope system may also be controlled by the synchroniser.

Figure 26:
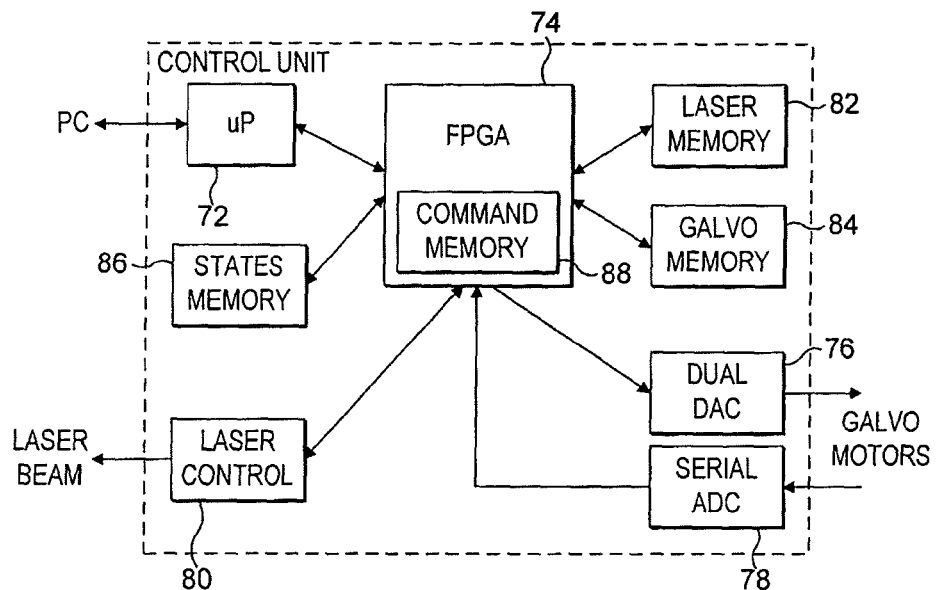
FIG. 26 is a block diagram relating to the control unit of FIG. 25.

The control unit incorporates the following hardware (see FIG. 26):
- The interface with the PC, around a Cypress FX2 USB microprocessor device 72 (USB 2.0 interface).
- The pattern drawing engine (FRAP) is driven by a Spartan 3 FPGA device 74.
- A dual DAC 76 has been added for driving the two galvos.
- A serial 4 channel ADC 78 will be able to read back the position of the galvos.
- Additional hardware for controlling seven optical switches (not shown).
- Laser control hardware 80.
- SRAM 82 for storing the LASER events.
- SRAM 84 for storing the GALVO vectors (movement).
- SRAM 86 for storing experiment STATES.

During the operation of the system:
1. The user defines on his PC screen the shape that he wants to "draw with the laser beam" around the biological sample.
2. The area is "translated" (in the application software) into GALVO vectors, LASER events, and CONTROL commands. The GALVO vectors provide the DAC values that are required for moving the galvanometer motors (galvos). The LASER events provide the ON/OFF pattern of the laser beam.
3. The above information is downloaded (using USB 2.0) to the Control Unit.
4. The FPGA following the CONTROL commands draws the pattern by moving the GALVO motors whilst switching ON/OFF the laser beam.

The FX2 uProcessor 72 provides the bridge between the PC 112 and the Control Unit 114. It is also responsible for running experiments that are stored inside the STATES memory 86. A typical experiment will include the drawing of different patterns in different areas of the sample.

The GALVO vectors are stored inside the GALVO memory 84, the LASER events are stored inside the LASER memory 82 and the CONTROL commands are stored inside the COMMAND memory 88.

The FPGA 74 reads the vectors and the laser events from the external memories and then drives the galvanomotors and synchronises the laser engines.

Drawing Pattern

Figure 27:
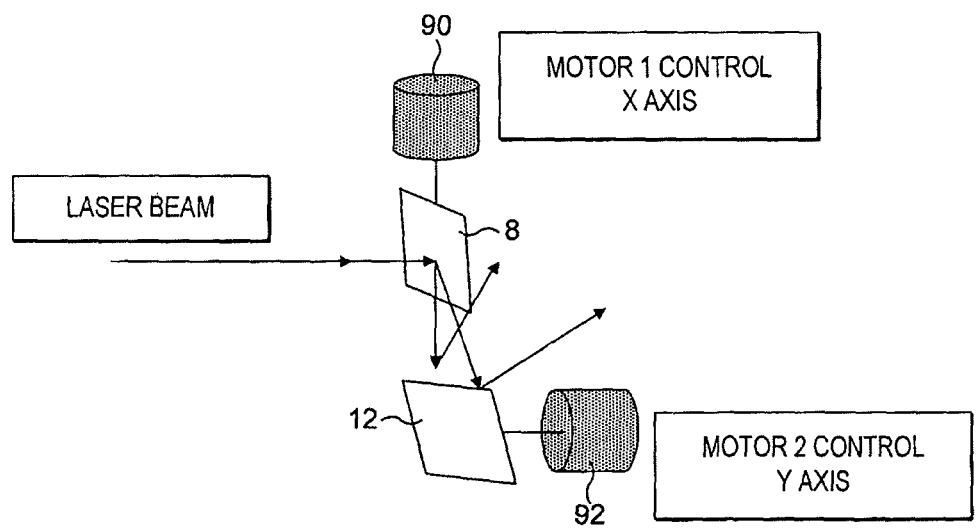
FIG. 27 is a perspective view of the beam directing means of the light input assembly shown in FIG. 2.

The laser beam falls onto the two mirrors 8, 12 that are mounted in two galvanomotors having X and Y control motors 90 and 92, respectively (see FIG. 27). By moving independently the two mirrors we can control in two axis the reflection of the laser beam.

Figure 28:
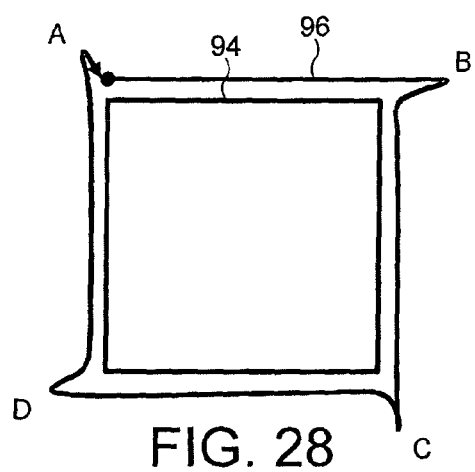
FIGS. 28 and 29 are diagrams illustrating control of the beam directing means of FIG. 27.

In theory we can draw accurately any shape having the laser beam on continuously. This doesn't apply in practice as the motors have inertia that prevents them to change direction instantly. As an example, consider drawing a square; the thick line 94 in FIG. 28 is the theoretical path of the laser beam and the thin line 96 is the actual path that the beam will follow if we drive the two motors. The galvanomotors cannot change instantly direction at points A, B, C and D and this is why the beam's path is not identical with the thick line.

Figure 29:
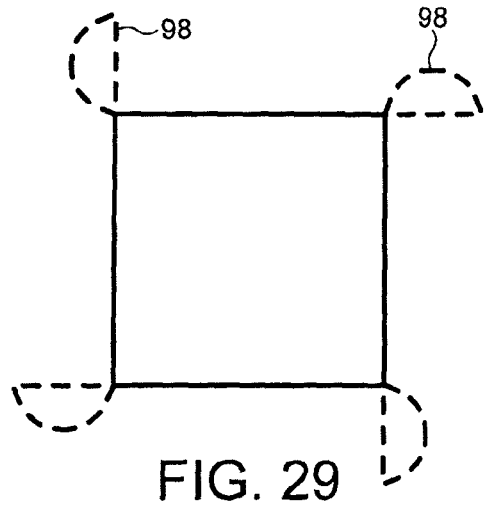

A way to overcome this problem is to switch off the laser beam at the points that overshoot the ideal line (A,B,C,D) and switch it on when it's back to the ideal path. So at the dashed lines 98 in FIG. 29 the laser beam is off and when the galvanomotors are in the ideal position is switched back on.

The FPGA

The primary function of the FPGA 74 is to drive the two motors and the laser on/off events. At the same time it is used as a bridge for filling the GALVO and LASER memory with data and most important of all to synchronise (Command Structure Engine) the two major engines (GALVO, LASER) during the operation (pattern drawing).

Figure 30:
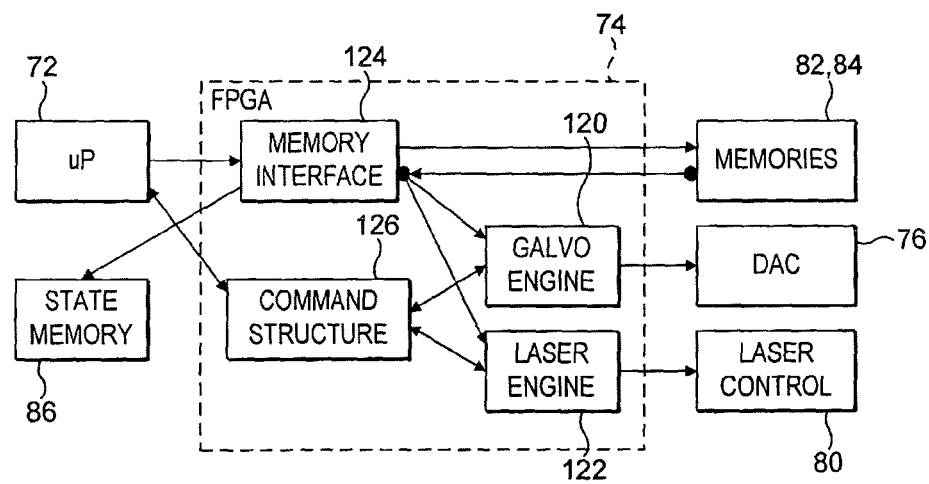
FIG. 30 is a block diagram of the FPGA of FIG. 26, and its interfaces with other electronic components of the control unit shown in FIG. 26.

The main functional blocks associated with the FPGA illustrated in FIG. 30 and described below.

Galvo Engine

The Galvo engine 120 controls the two galvo motors by setting the value of a dual DAC 76. When it runs, it reads vectors from the external memory and provides the values for the DAC. When it reads all the vectors (for the specific pattern) it generates the interrupt signal to the microprocessor 72. Three words are required for every vector. So the GALVO engine has to read the external GALVO memory three times before it updates the DAC.

GALVO Memory Structure

The GALVO memory 84 is used for storing the X and Y vectors. First the microprocessor 72 fills the GALVO memory with the vectors and then, during the FRAP cycle, the GALVO engine 120 reads the vectors and loads the DAC 76 with the predefined values.

Three words are required to describe a set of X and Y movement. The first word is the number of steps for the vector. X and Y galvos will execute the same number of steps but different number of DAC levels. Second and third words define the number of DAC levels for X and Y galvo plus the sign.

The memory structure can start from any memory location. The user can define the start address (for the specific FRAP cycle) by using a pointer instruction (LOAD POINTER X) in the command structure. By doing so, the GALVO memory can contain different FRAP areas so the user can select which area to frap by loading the corresponding pointer.

Laser Engine

The Laser engine 122 controls the on/off status of eight lasers. The engine reads the events from the external memory (LASER memory 82) and it executes one event after the other. The LASER engine must read two words from the laser memory before it is able to switch on/off the lasers.

Laser Memory Structure

The LASER memory 82 is physically different from the GALVO memory 84 and is used for storing the LASER events. The microprocessor stores the events in the LASER memory and then the LASER engine loads the events and switches on/off the lasers accordingly. The LASER memory has the following structure:

A bit pattern to stop the operation (End of Data), if not present it carries on as usual.

A timer to time between laser events.

A bit pattern to control laser on/off status.

Memory Interface

The memory interface block 124 is responsible for the link between the FPGA 74 and the microprocessor 72. This process is responsible for:

access to GALVO memory 84 access to LASER memory 82 access to STATES memory 86 (this memory is used for storing complex experiment's states)

access to Command memory 88 (this is an internal to the FPGA memory, it will be discussed later)

Command Structure Engine

When the microprocessor initiates the FRAP cycle (drawing pattern), the Command Structure Engine block 126 takes over the control of the operation. First it reads the commands that were stored (downloaded by the PC) in the internal RAM (Command Memory 88) and then executes one instruction after the other. There are seven commands that can be used for synchronising the LASER and GALVO engines 120, 122.

GALVONOW

The GALVONOW command will load a value to GALVO X (DAC) and a value to GALVO Y (DAC). Both GALVOs will go to the absolute location. The user can add the required DELAY to allow set-up time for the GALVOs. The DELAY command should be always used between GALVONOW command and STARTFRAP command.

LASERNOW

The LASERNOW command is used to enable or disable laser lines. This command controls the AOTF laser enable. The FPGA drives the laser enable only during the FRAP cycle. Every other time the laser enable is driven by the microprocessor.

Load Pointer X

This command will provide a memory (Galvo) address pointer to the GALVO engine. When STARTFRAP command is executed, the GALVO engine will read vectors (from the external GALVO memory) starting from this location.

Load Pointer Laser

This command is similar to the LOADPOINTERX. A pointer will be loaded to the LASER engine. When STARTFRAP is executed the LASER engine will read data (from the external LASER memory) from this location.

Start FRAP

This command will initiate the FRAP cycle. The GALVO engine will execute a number of vectors from the GALVO memory before it stops (the 'number of vectors' is stored in the command).

Stop FRAP

This command should be used at the end of Command structure memory block and immediately after the START FRAP command. The two commands together will initiate and terminate the FRAP cycle.

Delay

This command will add a delay in the execution of the FRAP cycle. It can be used to allow set-up time for the GALVO motors after the GALVONOW command execution and it is also used for synchronisation between the LASER and the GALVO engine.

Example

The following example is a typical pattern cycle and it demonstrates the usage of the internal command structure memory block.

---

Command

Galvo now
Set Galvo X DAC Position
Set Galvo Y DAC Position
The FPGA will load these values to the DAC and
the Galvos will immediately move to the new position
Load Pointer Laser
Load pointer laser, with the laser memory address value.
This indicates the LASER memory location where the user
has stored laser ON/OFF events. Multiple patterns can be
stored in different memory locations.
Load Pointer X
Load pointer galvo, with the laser memory address value.
This indicates the GALVO memory location where the
user has stored information for the
GALVO vectors (for this specific pattern).
Delay
Delay time.
StartFRAP
Number of vectors = 'I'.
The FPGA engine will executed 'I' GALVO vectors before
it stops.
StopFRAP

---

FPGA Implementation

Speed of Execution

The architecture of the FPGA allows the concurrent execution of the two main processes the GALVO and LASER engine. Because they work independently they can achieve high speeds of operation. So the GALVO can be updated every 10 us while the LASER engines can change state from ON to OFF within 100 ns.

Flexibility During Download

Independent external memories for the LASER and GALVO engine allow the user to modify very quickly only the vectors or the laser events i.e. if the user wants to draw the same shape/pattern but change only the laser events he doesn't have to re-download the pattern's vectors. He can only update the LASER memory. So the benefit to the user is very fast operation.

Flexibility During cFRAP

Using the GALVONOW command the user can move the galvanomotors to any point of the screen. So in order to draw a box around a biological sample, we have to download the LASER events, GALVO vectors and Command memory. Then the microprocessor initiates the FRAP cycle (pattern drawing). If the sample is moving and we want to re-draw the area around it, we don't have to re-fill the above memories. We just update using the GALVONOW command the start position of the pattern and we initiate the FRAP cycle. That allows the cFRAP where the user/application software can monitor and FRAP very quickly any biological sample.

Delay Command in Command Structure

The two major engines of the design work independently to each other so they must be synchronised during start-up. So although that there is an internal signal from the GALVO engine that starts the LASER engine, there is still propagation delay inside the device that we have to compensate during operation. This is achieved with the delay command. The delay command not only gives enough time to the galvo motors to move (during GALVONOW) to the specified position but also the user can eliminate the propagation delay time of the system. So with one command we eliminate the galvanomotors/system inertia and the propagation delay time of the FPGA.

Galvanometer Calibration Software

The microscope system described herein contains two optical systems. One system (the confocal head) is for imaging the sample; the other (the FRAP module) illuminates a selected region of the sample. It is desirable to illuminate a region of the sample specified from the sample image (WYSIWYG), and therefore desirable to have a method for relating the coordinates in these two optical systems.

Typically a linear model might be used for the coordinate transformation. For example this could account for offset, scale and rotation. However, there can be other distortions in the optics, for example pincushion or barrel distortion. Significant un-modeled distortions result in poor alignment of the optical systems. The effect of this could be a system in which it was not possible to illuminate accurately a specific region of a sample.

The inventors have developed a non-linear model to accurately align the optical systems. In this model, a second order polynomial warps image point (x,y) to galvo point (u,v) with equations:

$$u = a_{1,1} + a_{2,1}x + a_{3,1}y + a_{4,1}xy + a_{5,1}x^2 + a_{6,1}y^2$$

$$v = a_{1,2} + a_{2,2}x + a_{3,2}y + a_{4,2}xy + a_{5,2}x^2 + a_{6,2}y^2$$

The parameters $a_{1,1}$ and $a_{1,2}$ control zero point offset in the u and v coordinates; the parameters $a_{2,1}$ through $a_{3,2}$ controlling linear scaling and rotation of the axes; and the remaining $2^{nd}$ order parameters account substantially for any slight departures in linearity in the optics of both the viewing system and the illumination system. A similar set of equations but with different coefficients will yield the reverse coordinate transform.

By recording the locations in the viewing system of a minimum of six points illuminated at preselected galvo coordinates, the simultaneous equations that link the values of the coefficients can be solved. By using more than 6 points, preferably well-distributed around the field of view, one can apply the well-known methods of linear least squares fitting to yield best-fit values for the coefficients.

Calibration Steps

1 Insert the beamsplitter 16 and the calibration mirror into the viewing beam.
2 Insert the switch mirror 52 into the laser beam to direct the beam to the targeted illumination model.
3 Rotate the galvanometer mirrors to one of at least 6 preset electrical drive conditions.
4 Turn the laser beam on if necessary and using the system camera, record a picture of the laser spot
5 Determine the pixel location of the centre of the spot (for example by its centre of gravity or by a Gaussian peak fit).
6 Repeat steps 2 through 5 for at least 5 more preset galvo positions approximately evenly distributed about the field of view.

7 Solve the simultaneous equation for the coefficients a using standard mathematical techniques. For the exactly determined case (6 locations) use elimination; for the overdetermined case, which is preferable, (more than 6 locations) use the least squares method (solving the 'normal equations').

It will be appreciated that reference herein to a lens includes the use of multiple lenses in combination or a multicomponent lens for the same purpose.

The invention claimed is:

1. An assembly for use with a scanning confocal microscope system having confocal scanning head and a microscope, the microscope system having a light path extending from the confocal scanning head to the microscope, wherein said light path can pass through the assembly between a confocal scanning head side of the assembly and a microscope side of the assembly, the assembly being for inputting a light beam into said light path to illuminate a selected region of a sample mounted in the microscope, wherein the assembly comprises:
   a light input for receiving a light beam from a light source;
   a beam directing arrangement for controlling the path of the light beam within the assembly with reference to the shape of the selected region of the sample;
   a beam coupler for selectively coupling the light beam into the light path from the confocal scanning head to the microscope downstream of the beam directing arrangement, with the beam direction being controlled by the beam directing arrangement so as to illuminate the selected region; and
   an optical relay on said light path within the assembly to relay a sample image formed on the light path between the confocal scanning head and the microscope from the microscope side of the assembly to the scanning confocal head side of the assembly.

2. The assembly of claim 1, wherein the optical relay includes a baffle defining a hole in the light path to reduce transmission of stray light.

3. The assembly of claim 1 including a field lens between the beam coupler and the microscope to converge the light beam.

4. The assembly of claim 1, wherein the beam coupler includes a reflective element selectively insertable into the light path between the confocal scanning head and the microscope to facilitate injection of the transmitted light beam into the light path.

5. The assembly of claim 4, wherein the reflective element is a beamsplitter to allow the sample to be viewed therethrough via the confocal scanning head.

6. The assembly of claim 1 including a beam diameter adjustment arrangement upstream of the beam directing arrangement for selectively changing the diameter of the light beam to adjust the illumination spot size created at the sample.

7. The assembly of claim 6, wherein the beam diameter adjustment arrangement comprises a telescope arranged to be selectively inserted in the light beam.

8. The assembly of claim 7, wherein a plurality of telescopes having different optical properties are selectively insertable in the light beam, and front and rear lenses for each telescope are mounted on respective rotatable supports, to allow selective insertion of a lens on each support into the light beam.

9. The assembly of claim 1 including an input beam director upstream of the beam directing arrangement for adjusting the direction and lateral displacement of the light beam inputted into the assembly.

10. The assembly of claim 9, wherein the input beam director comprises an input beam collimator mounted in such a way that its orientation can be altered to adjust the direction and lateral displacement of the light beam inputted into the assembly.

11. The assembly of claim 10, wherein the collimator has a cylindrical outer surface adjacent each end, and a pair of linear adjusters is provided in contact with each of these surfaces, with the axes of the adjusters substantially parallel.

12. The assembly of claim 1, wherein the beam directing arrangement comprise two pivotably mounted mirrors, their pivotal axes being substantially mutually perpendicular to allow the direction of the light beam to be controlled in two orthogonal directions, and additional mirrors are provided in the optical path between the pivotably mounted mirrors to reduce the length of the space occupied thereby.

13. The assembly of claim 12, wherein the additional mirrors comprise a pair of plane mirrors in a mutually orthogonal configuration so as to reverse the direction of a beam incident on one of them.

14. The assembly of claim 13, wherein the pair of plane mirrors is mounted such that their position is adjustable along a line parallel to the incident beam, to provide focus adjustment.

15. The assembly of claim 1, wherein an aiming lens is provided to convert angular deflections of the light beam caused by the beam directing means into parallel beam displacements.

16. The assembly of claim 15, wherein the aiming lens is mounted so that its location is laterally adjustable, to adjust the aim of the light beam.

17. The assembly of claim 1 including a target selectively insertable in the light path in the image plane on the microscope side of the assembly to assist calibration of the assembly.

18. A microscope system comprising:
   a microscope;
   a camera;
   a confocal scanning head via which a sample mounted in the microscope is viewed using the camera;
   an assembly of claim 1; and
   a light source coupled to the assembly;
   wherein the system includes a controller for controlling both the beam directing arrangement and the light source so as to illuminate a selected region of a sample.

19. The system of claim 18, wherein the beam directing arrangement is operable in combination with the light source to direct the beam towards one or more discrete points on a sample.

20. The system of claim 18, wherein the beam directing arrangement is operable to manipulate the beam so that a predetermined region of the sample is substantially uniformly illuminated.

21. The system of claim 20, wherein the controller is operable to output control signals to the beam directing arrangement with reference to the shape of the selected region, which define movement of the beam over a sample as a sequence of steps of substantially equal distance.

22. The system of claim 18, wherein the controller is operable to control the beam directing arrangement such that the light beam is moved over the sample at a substantially constant velocity.

23. The system of claim 18, wherein the controller includes storage configured to store a set of instructions for controlling the light source separately from a set of instructions for controlling the beam directing arrangement, such that either set of instructions can be updated independently of the other set.

24. The system of claim 18, wherein the controller is operable to process in parallel instructions for controlling the light source and instructions for controlling the beam directing arrangement.

25. The system of claim 18, wherein the controller includes an FPGA (field-programmable gate array) programmed to calculate the control parameters to be outputted to the beam directing arrangement and the light source.

26. The system of claim 25, wherein the FPGA is configured to run parallel programs which calculate said parameters.

27. The system of claim 26, including an optical switch for selectively switching a light beam outputted by the light source between the light input of the scanning confocal head and the light input of the assembly.

28. The system of claim 27, wherein the optical switch includes a mirror switchable between a first position in which the light beam is not incident on the mirror, but passes from the switch to the scanning confocal head, and a second position in which the light beam is diverted for transmission from the switch to the light input of the assembly, and a driver for moving the mirror between the first and second positions.

29. The system of claim 28, wherein an optical relay is provided in each light path through the optical switch, to reduce sensitivity to angular misalignment in the switch, the relay is arranged to transfer the light input to the switch assembly to the respective output and focus the input beam to a point between the input and the output close to the mirror, and the mirror is switchable between two end stops and control means are coupled to the driver to accelerate the mirror during a first portion of its travel between the end stops and decelerate the mirror during a second portion of its travel.

30. The system of claim 28, wherein a pair of achromatic lenses is provided at each of the input and the outputs.

31. The system of claim 29, wherein the optical switch includes a rotary encoder for generating a signal indicative of the mirror's orientation.

32. The system of claim 28, wherein the mirror is biased against each end stop by the driver.

33. A method of calibrating a microscope system of claim 18, comprising the steps of:
(a) illuminating each of at least six points of a target in the assembly in turn according to predetermined beam directing arrangement settings;
(b) recording the position of each point with the camera;
(c) determining the camera pixel location of each point; and
(d) inputting the pairs of beam directing arrangement settings (u, v) and pixel locations (x, y) into the following equations:
and calculating the coefficients $a_{1,1}$ to $a_{6,2}$ from the resulting simultaneous equations $$u = a_{1,1} + a_{2,1}x + a_{3,1}y + a_{4,1}xy + a_{5,1}x^2 + a_{6,1}y^2$$

$$v = a_{1,2} + a_{2,2}x + a_{3,2}y + a_{4,2}xy + a_{5,2}x^2 + a_{6,2}y^2$$

34. A method of illuminating a selected region of a sample mounted in a scanning confocal microscope system including a confocal scanning head and a microscope having a light path extending from the confocal head to the microscope, the method comprising the steps of:
(a) receiving a light beam from a light source;
(b) controlling the direction of the light beam with reference to the shape of the selected region of the sample by means of a beam directing arrangement; and
selectively coupling the light beam into the light path from the confocal scanning head to the microscope, with the beam direction being controlled by the beam directing arrangement so as to illuminate the selected region of the sample.

* * * * *